United States Patent
Okiyama et al.

(10) Patent No.: US 10,662,277 B2
(45) Date of Patent: May 26, 2020

(54) POLYISOCYANATE COMPOSITION FOR PRODUCING FLEXIBLE POLYURETHANE FOAM, AND FLEXIBLE POLYURETHANE FOAM PRODUCTION METHOD USING SAME

(71) Applicant: TOSOH CORPORATION, Shunan-shi (JP)

(72) Inventors: Yoshihisa Okiyama, Yokohama (JP); Naoya Yoshii, Yokohama (JP); Keita Ishibashi, Yokohama (JP); Hiroyuki Orito, Yokohama (JP)

(73) Assignee: TOSOH CORPORATION, Shunan-shi (JP)

( * ) Notice: Subject to any disclaimer, the term of this patent is extended or adjusted under 35 U.S.C. 154(b) by 225 days.

(21) Appl. No.: 15/329,451

(22) PCT Filed: Jul. 28, 2015

(86) PCT No.: PCT/JP2015/071353
§ 371 (c)(1),
(2) Date: Jan. 26, 2017

(87) PCT Pub. No.: WO2016/017628
PCT Pub. Date: Feb. 4, 2016

(65) Prior Publication Data
US 2017/0210847 A1    Jul. 27, 2017

(30) Foreign Application Priority Data

Jul. 28, 2014  (JP) ................... 2014-152677
Sep. 22, 2014  (JP) ................... 2014-192444
Sep. 22, 2014  (JP) ................... 2014-192446

(51) Int. Cl.
| | | |
|---|---|---|
| C08G 18/76 | (2006.01) | |
| C08G 18/10 | (2006.01) | |
| C08J 9/28 | (2006.01) | |
| C08G 18/48 | (2006.01) | |
| C08G 101/00 | (2006.01) | |

(52) U.S. Cl.
CPC ......... C08G 18/7657 (2013.01); C08G 18/10 (2013.01); C08G 18/4825 (2013.01); C08G 18/76 (2013.01); C08J 9/28 (2013.01); C08G 2101/0008 (2013.01); C08G 2101/0083 (2013.01)

(58) Field of Classification Search
CPC .... C08G 18/10; C08G 18/4825; C08G 18/76; C08G 18/7657; C08G 2101/0008; C08G 2101/0083; C08J 9/28
See application file for complete search history.

(56) References Cited

U.S. PATENT DOCUMENTS

| | | |
|---|---|---|
| 6,133,481 A | 10/2000 | Singh et al. |
| 2003/0158281 A1 | 8/2003 | Parfondry et al. |
| 2012/0196946 A1 | 8/2012 | Macken et al. |
| 2013/0331473 A1* | 12/2013 | Motta ............... C08G 18/1875 521/160 |

FOREIGN PATENT DOCUMENTS

| | | |
|---|---|---|
| CN | 1246873 A | 3/2000 |
| CN | 101668787 A | 3/2010 |
| CN | 101993520 A | 3/2011 |
| CN | 102695737 A | 9/2012 |
| EP | 0 960 150 A1 | 12/1999 |
| EP | 1 174 453 A1 | 1/2002 |
| EP | 2 344 560 A1 | 7/2011 |
| JP | 11-171962 A | 6/1999 |
| JP | 11-171963 A | 6/1999 |
| JP | 11-255857 A | 9/1999 |
| JP | 2000-8083 A | 1/2000 |
| JP | 2001-137077 A | 5/2001 |
| JP | 2001-512501 A | 8/2001 |

(Continued)

OTHER PUBLICATIONS

Extended European Search Report dated Feb. 23, 2018 in Patent Application No. 15826315.2.
International Search Report dated Oct. 27, 2015 in PCT/JP2015/071353 filed Jul. 28, 2015.
Combined Chinese Office Action and Search Report dated Jul. 23, 2018 in Patent Application No. 201580039566.8 (with English translation of Categories of Cited Documents), citing documents AO-AR and AX therein, 9 pages.

(Continued)

*Primary Examiner* — John M Cooney
(74) *Attorney, Agent, or Firm* — Oblon, McClelland, Maier & Neustadt, L.L.P.

(57) ABSTRACT

Provided are: an isocyanate composition for producing a flexible foam that has good vibration absorption as a result of having a low rebound resilience rate and a low hysteresis loss rate even in a low-density area; a composition for forming a flexible foam in which the isocyanate composition is used; and a flexible foam production method in which the composition for forming a flexible foam is used. The composition for forming a flexible foam has a low hysteresis loss rate and high durability in, a high hardness range and in a low density range. The flexible foam production method uses this composition for forming a flexible foam. The flexible foam production method does not cause odor problems or the like, maintains the durability required of a flexible foam even when the density thereof is reduced, and achieves good riding comfort properties and high safety. The problem addressed by the present invention is solved by the use of at least a specific modified polyisocyanate composition, the use of a specific polyoxyalkylene polyol, and the use of a reactive amine catalyst.

20 Claims, No Drawings

(56) References Cited

FOREIGN PATENT DOCUMENTS

| JP | 2001-316443 A | 11/2001 |
|----|---------------|---------|
| JP | 2004-526021 A | 8/2004 |
| JP | 2006-513277 A | 4/2006 |
| JP | 2013-507460 A | 3/2013 |
| JP | 2013-541630 A | 11/2013 |
| JP | 2014-532397 A | 12/2014 |
| WO | 98/34973 A1 | 8/1998 |
| WO | 02/068493 A1 | 9/2002 |
| WO | 2004/014980 A1 | 2/2004 |
| WO | 2011/042284 A2 | 4/2011 |
| WO | 2012/061496 A1 | 5/2012 |
| WO | 2013/060779 A1 | 5/2013 |

OTHER PUBLICATIONS

"Handbook of Raw Materials and Additives for Polyurethanes" Chemical Industry Press, Second Edition, Jan. 31, 2013, 8 pages (with partial English translation).

International Preliminary Report on Patentability and Written Opinion dated Jan. 31, 2017 in PCT/JP2015/071353 (with English language translation).

* cited by examiner

POLYISOCYANATE COMPOSITION FOR PRODUCING FLEXIBLE POLYURETHANE FOAM, AND FLEXIBLE POLYURETHANE FOAM PRODUCTION METHOD USING SAME

TECHNICAL FIELD

The present invention relates to a polyisocyanate composition for producing a flexible polyurethane foam, and a flexible polyurethane foam production method using the same.

BACKGROUND ART

Flexible polyurethane foams (hereinafter, occasionally referred to as "flexible foam") are generally produced through a reaction of a polyol and a polyisocyanate in the presence of a catalyst, a blowing agent, and, as necessary, a foam stabilizer, a flame retardant, or a crosslinking agent, etc.

For example, flexible foams for seat cushions for automobiles are required to have high durability to reduce the change in the viewpoint of a driver due to the reduction of the thickness even in a long driving, from the viewpoint of safety. For recent seat cushions, on the other hand, it is required to lower the modulus of repulsion elasticity of a foam for the purpose of reducing the vibration transmitted from the surface of a road and to lower the foam density to the maximum extent from the viewpoint of cost reduction. However, such reduction of repulsion or lowering of density is known to significantly deteriorate the foam durability, and a technique to achieve durability, a ride quality, and economic efficiency in combination has been required.

For a means to solve the problems, for example, a flexible foam using a mixture of tolylene diisocyanate (hereinafter, occasionally referred to as "TDI") and polyphenylene-polymethylene polyisocyanate (hereinafter, occasionally referred to as "Poly-MDI") has been proposed (e.g., see Patent Literature 1).

However, flexible foams containing TDI as a main raw material (hereinafter, occasionally referred to as "TDI-based flexible foam") are known to have a higher modulus of repulsion elasticity than flexible foams containing diphenylmethane diisocyanate (hereinafter, occasionally referred to as "MDI") as a main raw material (hereinafter, occasionally referred to as "MDI-based flexible foam"), and a large amount of the modulus of repulsion elasticity needs to be lowered to achieve a sufficient vibration absorbability.

Examples of means to lower the modulus of repulsion elasticity include lowering of the crosslinking density or elevation of the glass transition temperature for a resin, and reduction of the air permeability of a foam; however, these are all known to deteriorate the durability of a flexible foam, and as a consequence TDI-based flexible foams cannot achieve a satisfactory vibration absorbability owing to a low modulus of repulsion elasticity and a high durability owing to a low hysteresis loss rate in combination.

Further, TDI-based flexible foams have a large density difference between the skin layer and the core layer in the foam, which results in a harder surface texture and a poorer ride performance than a foam having corresponding 25% compression hardness and hysteresis loss rate. Furthermore, use of TDI, which has a high vapor pressure, is known to deteriorate the working environment of a place for flexible foam production.

In contrast, MDI-based flexible foams are believed to be able to achieve vibration absorbability and durability in combination in a high density region, in which the modulus of repulsion elasticity is generally low, more easily than TDI-based flexible foams.

However, MDI has a lower isocyanate group content (NCO content) per unit weight than TDI, and it is required to blend a large quantity of water to lower the density of a flexible foam. In a low density region of lower than 55 kg/m$^3$, which is required for recent seat cushions, the number of rigid urea linkages generated through a reaction of an isocyanate and water increases to decrease the restoration of deformation of a resin, and as a result the durability is deteriorated and a satisfactory feeling, a feature of MDI-based foams, is also lost. Accordingly, an MDI-based flexible foam having a hysteresis loss rate, which is an indicator of durability, of lower than 28%, has not been provided in the above-mentioned low density region.

As a method for producing a flexible foam having a high resilience (high repulsion) at a density of 40 to 45 kg/m$^3$, for example, a method has been proposed in which an unmodified MDI containing 81 to 100% of diphenylmethane diisocyanate containing 40 to 60% of 2,2'-diphenylmethane diisocyanate and 2,4'-diphenylmethane diisocyanate therein, and a polyol composition containing a polyether polyol having a nominal average hydroxyl functionality of 2 to 6 and an average equivalent weight of 200 to 600 and containing at least 60% by weight of an oxyethylene group are reacted together (e.g., see Patent Literature 2).

In this method, however, another active hydrogen group-containing compound including water and the polyol having an oxyethylene unit react with the isocyanate in competition, and thus the reaction of the terminal hydroxy group of the polyol having an oxyethylene unit is not completed presumably, and an effect of lowering the hysteresis loss rate cannot be achieved sufficiently.

CITATION LIST

Patent Literature

Patent Literature 1: Japanese Unexamined Patent Publication No. 2001437077

Patent Literature 20 International Publication No. WO2000/008083

SUMMARY OF INVENTION

Technical Problem

The present invention was made in view of the above background arts, and a first object of the present invention is to provide an isocyanate composition for producing a flexible foam which has a satisfactory vibration absorbability owing to a low modulus of repulsion elasticity and achieves a low hysteresis loss rate even in a low density region of lower than 55 kg/m$^3$, a composition for flexible foam molding using the isocyanate composition, and a flexible foam production method using the composition for flexible foam molding.

A second object of the present invention is to provide a composition for flexible foam molding which achieves a low hysteresis loss rate and high durability in a high hardness range and a low density range, and a flexible foam production method using the composition for flexible foam molding.

A third object of the present invention is to provide a flexible foam production method which does not cause odor problems or problems relating to toxicity or the environment and allows for maintaining durability required for flexible foams and provides a satisfactory ride quality and high safety in combination even in the case that the density is lowered to lower than 55 kg/m$^3$.

Solution to Problem

The present inventors conducted diligent research to solve the above problems, and thus completed the present invention.

Specifically, the present invention includes a polyisocyanate composition for producing a flexible polyurethane foam, a composition for flexible polyurethane foam molding, and a flexible polyurethane foam production method using the same, each of which will be described in the following.

[1] A polyisocyanate composition for producing a flexible polyurethane foam, comprising a modified polyphenylene-polymethylene polyisocyanate (c) in which a polyphenylene-polymethylene polyisocyanate (a) is urethane-modified with a polyol (b), wherein the polyphenylene-polymethylene polyisocyanate (c) contains 65 to 90% by mass of diphenylmethane diisocyanate and the quantity of 2,2'-diphenylmethane diisocyanate and 2,4'-diphenylmethane diisocyanate contained in the diphenylmethane diisocyanate is 10 to 50% by mass based on the total quantity of the diphenylmethane diisocyanate, the polyol (b) contains 50 to 100% by mass of a polyoxyethylene unit and has an average number of functional groups of 1.7 to 4, and the isocyanate content of the modified polyphenylene-polymethylene polyisocyanate (c) is 25 to 32% by mass.

[2] The polyisocyanate composition for producing a flexible polyurethane foam according to the above [1], wherein the freezing point of the polyol (b) at the atmospheric pressure is within a range of 10 to 45° C.

[3] A method for producing the polyisocyanate composition for producing a flexible polyurethane foam according to the above [1] or [2], the method comprising reacting a polyphenylene-polymethylene polyisocyanate (c) and a polyol (b) so that the isocyanate content reaches 25 to 32% by mass, the polyphenylene-polymethylene polyisocyanate (c) containing 65 to 90% by mass of diphenylmethane diisocyanate, the quantity of 2,2'-diphenylmethane diisocyanate and 2,4'-diphenylmethane diisocyanate contained in the diphenylmethane diisocyanate being 10 to 50% by mass based on the total quantity of the diphenylmethane diisocyanate, and a polyol (b) containing 50 to 100% by mass of a polyoxyethylene unit and having an average number of functional groups of 1.7 to 4.

[4] A composition for flexible polyurethane foam molding, the composition comprising a polyol component (A) and a polyisocyanate component (B), wherein the polyol component (A) contains a polyoxyalkylene polyol and the polyisocyanate component (B) is the polyisocyanate composition according to the above [1] or [2].

[5] The composition for flexible polyurethane foam molding according to [4], wherein the polyol component (A) contains a polyoxyalkylene polyol (d1) having a total degree of unsaturation of 0.001 to 0.030 meq./g, a hydroxyl value of 18 to 50 mgKOH/gig, and an average number of functional groups of 2 to 4 at a content of at least 30% by mass based on the total quantity of the polyol component (A) to be used.

[6] The composition for flexible polyurethane foam molding according to the above [5], wherein the terminal primary hydroxylation rate of the polyoxyalkylene polyol (d1) is 60 to 90%.

[7] The composition for flexible polyurethane foam molding according to the above [4], wherein the polyol component (A) contains a polyoxyalkylene polyol (d2) having a total degree of unsaturation of 0.001 to 0.040 meq/g, an average number of functional groups of 2 to 4, and a hydroxyl value of 18 to 38 mgKOH/g at a content of 30% by mass or more based on the total quantity of the polyol component (A) to be used.

[8] The composition for flexible polyurethane foam molding according to the above [4], wherein the polyol component (A) contains at least one polyol selected from the group consisting of a polyoxyalkylene polyol (d2) having a total degree of unsaturation of 0.001 to 0.040 meq/g, an average number of functional groups of 2 to 4, and a hydroxyl value of 18 to 38 mgKOH/g, a polyoxyalkylene polyol (d) other than the polyoxyalkylene polyol (d2), and a polymer polyol (e), wherein the contents of (d2), (d), and (e) are 50 to 100% by mass, 0 to 10% by mass, and 0 to 50% by mass, respectively, based on the total mass of (d2), (d), and (e).

[9] A flexible polyurethane foam production method, wherein the composition for flexible polyurethane foam molding according to any one of the above [4] to [8] is reacted in the presence of a catalyst (C), water (D) as a blowing agent, and a foam stabilizer (E).

[10] The flexible polyurethane foam production method according to the above [9], wherein a reactive amine catalyst (f) having in the molecule a hydroxy group reactive with a polyisocyanate is used as the catalyst (C).

Advantageous Effects of Invention

The composition for flexible foam molding containing the isocyanate composition for producing a flexible foam according to the present invention enables production of a flexible foam which has a satisfactory vibration absorbability owing to a low modulus of repulsion elasticity and achieves a low hysteresis loss rate even in a low density region.

Use of a polyoxyalkylene polyol having a specific degree of unsaturation for the composition for flexible foam molding according to the present invention enables production of a flexible foam which achieves a low hysteresis loss rate and high durability in a high hardness range and a low density range.

In addition, use of a specific reactive catalyst for a catalyst in the flexible foam production method using the composition for flexible foam molding according to the present invention enables production of a flexible foam which does not cause odor problems or problems relating to toxicity or the environment and allows for maintaining high durability and provides a satisfactory ride quality and high safety in combination even in a low density region.

DESCRIPTION OF EMBODIMENTS

First, a polyisocyanate composition according to the present invention will be described.

The polyisocyanate composition according to the present invention comprises a modified polyphenylene-polymethylene polyisocyanate (c) in which a polyphenylene-polymethylene polyisocyanate (a) is urethane-modified with a polyol (b), and is characterized in that (1) the polyphenylene-polymethylene polyisocyanate (a) contains 65 to 90% by mass of diphenylmethane diisocyanate and the quantity of 2,2'-diphenylmethane diisocyanate and 2,4'-diphenylmethane diisocyanate contained in the diphenylmethane diisocyanate is 10 to 50% by mass based on the total quantity of the diphenylmethane diisocyanate, (2) the polyol (b) contains 50 to 100% by mass of a polyoxyethylene unit and has an average number of functional groups of 1.7 to 4, (3) the isocyanate content of the modified polyphenylene-polymethylene polyisocyanate (c) is 25 to 32% by mass, and (4) the polyisocyanate composition is used for producing a flexible foam.

The polyphenylene-polymethylene polyisocyanate (a) in the present invention contains diphenylmethane diisocyanate (MDI), which has two benzene rings and two isocyanate groups, a polynuclear substance having three or more benzene rings and three or more isocyanate groups, and a small quantity of an impurity commonly contained in commercially available polyphenylene-polymethylene polyisocyanates (Poly-MDI) (e.g., an isocyanate dimer, methylated or chlorinated products of Poly-MDI, carbodiimide or uretonimine compounds).

The content by mass of MDI in the Poly-MDI (a) (hereinafter, referred to as "MDI content") is a content of MDI based on the Poly-MDI (a) with the polyol (b) having an oxyethylene unit excluded from the compositional unit of the modified polyphenylene-polymethylene polyisocyanate (c). This can be measured by using a gel permeation chromatograph or a gas chromatograph. In the case that MDI, a polynuclear substance, etc., are blended to prepare the Poly-MDI (a), the MDI content can be determined by calculation if the MDI contents of the raw materials have been known in advance. It is preferable that the MDI content be 65 to 90% by mass, and it is more preferable the MDI content be 70 to 85% by mass.

If the MDI content is over 90% by mass in the present invention, the low-temperature storage stability of a polyisocyanate composition to be obtained, and the durability and hardness of a flexible foam to be obtained are lowered. If the MDI content is less than 65% by mass, on the other hand, a foam provided is so hard to the extent that the foam is not suitable for seat cushions due to excessively high crosslinking density, and the tensile elongation rate at break of the foam is lowered, and thus a foam strength sufficient for a flexible foam for seats in vehicles cannot be obtained.

In addition, it is required that the sum total of the content of 2,2'-diphenylmethane diisocyanate (hereinafter, occasionally referred to as "2,2'-MDI") and the content of 2,4'-diphenylmethane diisocyanate (hereinafter, occasionally referred to as "2,4'-MDI") based on the total quantity of MDI (hereinafter, occasionally referred to as "isomer content") be 10 to 50% by mass, and it is more preferable that the isomer content be 20 to 45% by mass.

If the isomer content is less than 10% by mass in the present invention, the low-temperature storage stability of a polyisocyanate composition to be obtained is deteriorated, and steady heating is required in a place to store an isocyanate, pipings, and a foam molding machine, and in addition the molding stability of a flexible foam is deteriorated and the collapse of a foam, etc., occurs during foaming. If the isomer content is over 50% by mass, on the other hand, the foam hardness is lowered, and problems are caused such as failure to ensure a hardness sufficient for seat cushions, seat backs, saddles, or the like, a prolonged molding cycle due to lowered reactivity, and the increase of the hysteresis loss rate due to the increase of the closed cell ratio of a foam.

It is required that at least the oxyethylene unit content of the polyoxyalkylene polyol (b) having a polyoxyethylene unit used for synthesis of the polyisocyanate composition according to the present invention be 50 to 100% by mass, and it is more preferable that the oxyethylene unit content be 60 to 100% by mass. It is required that the average number of functional groups of the polyoxyalkylene polyol (b) be 1.7 to 4, and it is more preferable that the average number of functional groups be 1.9 to 2.4.

The present invention can achieve a low hysteresis loss rate and a high durability, even in the case of a foam having a low modulus of repulsion elasticity, by urethane-modifying the Poly-MDI (a) with the polyol (b) having a specific oxyethylene unit content and a specific average number of functional groups of a polymerization initiator to provide a pseudo-crosslinked structure by virtue of electrostatic interaction between oxyethylene units or between an oxyethylene unit and a urethane linkage or urea linkage in a resin on being converted to a flexible foam, and a polyol for modification having an oxyethylene unit content of less than 50% cannot provide the interaction sufficiently, and a satisfactory effect cannot be obtained.

If the average number of functional groups is less than 1.7, the chemical crosslinking density in a flexible foam resin is lowered, and the hysteresis loss rate and durability are insufficient even though the pseudo-crosslinking is present. If the average number of functional groups is over 4, on the other hand, the hysteresis loss rate can be maintained and the durability can be enhanced; however, lowering of mechanical strength, primarily an elongation rate, is significant in comparison with the case that the pseudo-crosslinking is enhanced, and such a breakable foam is not preferable for use for seat cushions, seat backs, saddles, or the like in an automobile which passengers frequently get in or out.

Here, the average number of functional groups of the polyol (b) is a value on the assumption that the average number of functional groups of a polymerization initiator is unchanged even after polymerization. In the case that a plurality of polyols are mixed together, the average number of functional groups refers to a value obtained by determining the mole from the molecular weight and quantity blended for each polyol, calculating the product of the mole and the average number of functional groups of a polymerization initiator for each polyol, summing up the products for all the polyols, and dividing it by the sum total of the moles of the polyols.

If the polyol (b) satisfies the above oxyethylene unit content and average number of functional groups, a satisfactory flexible foam performance can be achieved. If the freezing point of the polyol (b) is within 10 to 45° C., and more preferably is within 20 to 40° C., in particular, a more excellent performance can be obtained. Polyols having a freezing point of 10° C. or higher have high cohesive force and a high hysteresis loss rate-improving effect among polyols satisfying the above oxyethylene unit content and average number of functional groups of a polymerization initiator. On the other hand, polyols having a freezing point of over 45° C. have a higher hysteresis loss rate-improving effect due to that the oxyethylene units have very high cohesive force; however, such excessively high cohesion force raises the freezing point of an isocyanate itself and may deteriorate low-temperature storage stability.

Here, a freezing point refers to a maximum temperature among temperatures at which precipitation of a crystal can be visually found in a polyol after storage for 24 hours in a 100 mL glass bottle with a lid in a thermostatic water bath whose temperature is accurately controlled at an interval of 1° C. with a calibrated mercury thermometer.

It is preferable that the CPR value (controlled polymerization rate) defined in JIS K 1557 of the polyol (b) be 10 or lower. More preferably, the CPR value is 5 or lower. If the CPR value is over 10, trimerization, allophanatization, or dimerization reaction other than urethanization reaction is accelerated in urethane modification of an isocyanate, and the isocyanate during synthesis solidifies or the viscosity of the isocyanate unexpectedly increases, resulting in failure in practical use.

Although it is difficult to simply specify the freezing point of the polyol (b) on the basis of the range of average molecular weight by referring to the molecular weight distribution, the size, degree of dispersion, or degree of branching of an oxyethylene glycol unit, examples of available products of the polyol (b) include PEG-600 manufactured by Sanyo Chemical Industries, Ltd., PEG-1000 manufactured by the same company, PEG-1540 manufactured by the same company, FA-103 manufactured by the same company, and UNILUBE 75DE-15 manufactured by NOF CORPORATION.

Two or more polyols (b) may be used in a mixture, as long as the above oxyethylene unit content and average number of functional groups can be achieved and preferably the above freezing point and CPR value can be achieved.

In the present invention, it is required that the isocyanate group content (NCO content) of the modified polyphenylene-polymethylene polyisocyanate (c) be 25 to 32% by mass, and it is more preferable that the isocyanate group content be 29 to 32% by mass. If the NCO content is less than 25% by mass, the condition of mixing with the polyol component is deteriorated or the flowability of a mixed foam solution is degraded due to that the viscosity of the isocyanate is excessively high, and molding failure such as insufficient filling at a mold terminal is caused in many cases. If the NCO content is less than 29% by mass, moldability may not be ensured in a low density region in the case that the quantity of carbon dioxide generated through a reaction of an isocyanate and water is excessively small. If the NCO content is over 32% by mass, the quantity of the polyol (b) having an oxyethylene unit is excessively small, and thus a hysteresis loss rate-reducing effect cannot be achieved sufficiently.

The synthesis method for reacting the Poly-MDI (a) and the polyol (b) is not particularly limited, and examples thereof which can be applied include a method in which the polyol having an oxyethylene unit in a full quantity is charged into the Poly-MDI in a full quantity to form a prepolymer, and a method in which the polyol having an oxyethylene unit is reacted with a part of the MDI and the rest Poly-MDI is mixed therein.

Next, a composition for flexible polyurethane foam molding according to the present invention will be described.

The composition for flexible polyurethane foam molding according to the present invention comprises a polyol component (A) and a polyisocyanate component (B), and is characterized in that the polyol component (A) contains a polyoxyalkylene polyol and the polyisocyanate component (B) is the above-described polyisocyanate composition according to the present invention.

The polyol component (A) according to the present invention contains a polyoxyalkylene polyol obtained by subjecting an initiator to ring-opening addition polymerization with an alkylene oxide in the presence of a ring-opening addition polymerization catalyst.

In the present invention, it is preferable to use a polyoxyalkylene polyol (d) having a hydroxyl value of 18 to 50 mgKOH/g and an average number of functional groups of 2 to 4, which facilitate development of an excellent performance as a flexible foam.

If the hydroxyl value of the polyoxyalkylene polyol is over 50 mgKOH/g, the hardness of a polyurethane foam is excessively high, and in addition the softness may be lowered. If the hydroxyl value of the polyoxyalkylene polyol is lower than 18 mgKOH/g, on the other hand, the hardness of a polyurethane foam to be obtained is excessively low for a flexible foam for seats in vehicles, and mixing failure or the like due to its high viscosity is likely to occur. It is more preferable that the hydroxyl value of the polyoxyalkylene polyol be within the range of 20 to 38 mgKOH/g.

In the present invention, a known polyoxyalkylene polyol may be used for the polyoxyalkylene polyol (d), and examples thereof include polyoxyalkylene polyols obtained by adding an alkylene oxide such as ethylene oxide and propylene oxide or a cyclic ether such as tetrahydrofuran to a low-molecular weight polyol, a low-molecular weight polyamine, a low-molecular weight aminoalcohol, or the like, each having a number average molecular weight of lower than 700, as an initiator in the presence of a ring-opening addition polymerization catalyst.

For the initiator for the polyoxyalkylene polyol (d), a bifunctional to tetrafunctional short chain polyol may be used. Specific examples thereof include water; low-molecular weight polyols such as ethylene glycol, 1,2-propanediol, 1,3-propanediol, 1,2-butanediol, 1,3-butanediol, 1,4-butanediol, 1,5-pentanediol, 2-methyl-1,5-pentanediol, 3-methyl-1,5-pentanediol, 1,6-hexanediol, neopentyl glycol, 1,8-octanediol, 1,9-nonanediol, 2,2-diethyl-1,3-propanediol, 2-n-butyl-2-ethyl-1,3-propanediol, 2,2,4-trimethyl-1,3-pentanediol, 2-ethyl-1,3-hexanediol, 2-n-hexadecan-1,2-ethylene glycol, 2-n-eicosan-1,2-ethylene glycol, 2-n-octacosan-1,2-ethylene glycol, diethylene glycol, dipropylene glycol, 1,4-cyclohexanedimethanol, a bisphenol A-ethylene oxide adduct or bisphenol A-propylene oxide adduct, hydrogenated bisphenol A, 3-hydroxy-2,2-dimethylpropyl-3-hydroxy-2,2-dimethylpropionate, trimethylolpropane, glycerin, and pentaerythritol; low-molecular weight amines such as aniline, ethylenediamine, propylenediamine, toluenediamine, meta-phenylenediamine, diphenylmethanediamine, and xylylenediamine; and low-molecular weight aminoalcohols such as monoethanolamine, diethanolamine, triethanolamine, and N-methyldiethanolamine.

Among them, ethylene glycol, diethylene glycol, glycerin, trimethylolpropane, and pentaerythritol are preferable because they have high versatility and thus are inexpensive, and are satisfactory in stability of supply.

Examples of the alkylene oxide for ring-opening addition polymerization of the initiator include epoxy compounds such as ethylene oxide, propylene oxide, 1,2-butylene oxide, 2,3-butylene oxide, styrene oxide, and cyclohexene oxide. Among them, ethylene oxide, propylene oxide, 1,2-butylene oxide, and styrene oxide are preferable, and ethylene oxide and propylene oxide are more preferable. One of the alkylene oxides may be used singly, or two or more thereof may be used in combination. In the case that two or more of the alkylene oxides are used in combination, combination use of propylene oxide and ethylene oxide is particularly preferable.

Examples of available products of the polyoxyalkylene polyol (d) include SANNIX FA-921 manufactured by Sanyo Chemical Industries, Ltd., SANNIX FA-703 manufactured by the same company, SANNIX FA-103 manufactured by the same company, and EXCENOL 838 manufactured by ASAHI GLASS CO., LTD.

Examples of the ring-opening addition polymerization catalyst for the polyoxyalkylene polyol (d) include KOH catalysts, composite metal cyanide complex catalysts, phosphazene catalysts, and imino group-containing phosphazenium salts. Among them, it is preferable to use a composite metal cyanide complex catalyst, a phosphazene catalyst, or an imino group-containing phosphazenium salt.

It is known that, if a polyoxyalkylene polyol is produced by using a KOH catalyst, a monool having an unsaturated group at the end is by-produced as the molecular weight of the polyoxyalkylene polyol increases, and if a polyoxyalkylene polyol containing a large quantity of the monool is used as a raw material for a polyurethane, the resultant polyurethane may have low hardness or durability.

In the present invention, specific examples of the polyoxyalkylene polyol (d) include a polyoxyalkylene polyol (d1) having a total degree of unsaturation of 0.001 to 0.030 meq./g, a hydroxyl value of 18 to 50 mgKOH/g, and an average number of functional groups of 2 to 4, and a polyoxyalkylene polyol (d2) having a total degree of unsaturation of 0.001 to 0.040 meq/g, an average number of functional groups 2 to 4, and a hydroxyl value of 18 to 38 mgKOH/g.

The larger the total degree of unsaturation of the polyoxyalkylene polyol (d) is, the larger the quantity of a monool component having an unsaturated group at the end is, and setting the total degree of unsaturation to 0.040 meq./g or lower further increases the crosslinking density of a flexible foam and as a result the durability is further enhanced. It is difficult to industrially produce a polyoxyalkylene polyol having a total degree of unsaturation of lower than 0.001 meq./g.

If the degree of unsaturation is within the above range, two or more polyols may be used in a mixture.

The degree of unsaturation (unit: meq./g) of a polyoxyalkylene oxide can be calculated in accordance with a method described in JIS K-1557.

In the present invention, it is preferable that the terminal primary hydroxylation rate of the polyoxyalkylene polyol (d1) be 60 to 90%, and it is more preferable that the terminal primary hydroxylation rate of the polyoxyalkylene polyol (d1) be 70 to 90%. If the terminal primary hydroxylation rate is lower than 60%, the molding stability of a molded flexible polyurethane foam is lowered, and collapse or sink marks may be caused. If the terminal primary hydroxylation rate is higher than 90%, on the other hand, the number of closed cells in a foam is large, and molding shrinkage may be caused. Here, the terminal primary hydroxylation rate refers to the fraction of primary hydroxyl groups among terminal hydroxyl group, and can be represented as [(number of primary hydroxyl groups/total number of hydroxyl groups)× 100(%)].

In the present invention, it is more preferable that the total degree of unsaturation of the polyoxyalkylene polyol (d2) be 0.001 to 0.030 meq/g.

The polyoxyalkylene polyols (d1) and (d2) can be produced, for example, by using a composite metal cyanide complex catalyst, a phosphazene catalyst, or an imino group-containing phosphazenium salt as a ring-opening addition polymerization catalyst.

For an initiator for the polyoxyalkylene polyols (d1) and (d2), the above-described bifunctional to tetrafunctional short chain polyol may be used.

It is preferable to use a trifunctional to tetrafunctional short chain polyol for an initiator for the polyoxyalkylene polyol (d2). Specific examples of such initiators include low-molecular weight polyols such as trimethylolpropane, glycerin, and pentaerythritol; low-molecular weight amines such as aniline, ethylenediamine, propylenediamine, toluenediamine, meta-phenylenediamine, diphenylmethanediamine, and xylylenediamine; and low-molecular weight aminoalcohols such as monoethanolamine, diethanolamine, triethanolamine, and N-methyldiethanolamine.

Among them, glycerin, trimethylolpropane, and pentaerythritol are preferable for an initiator for the polyoxyalkylene polyol (d2) because they have high versatility and thus are inexpensive, and are satisfactory in stability of supply.

For the composition for flexible polyurethane foam molding according to the present invention, a polymer polyol (e) produced by polymerizing a vinyl monomer with a conventional method may be concomitantly used in the polyol component (A) for the purpose of hardness adjustment. Examples of such polymer polyols include polymer polyols prepared by polymerizing a vinyl monomer in the polyether polyol as described for the polyoxyalkylene polyol (d) to stably disperse therein in the presence of a radical initiator. Examples of the vinyl monomer include acrylonitrile, styrene, vinylidene chloride, hydroxyalkyls, methacrylates, and alkyl methacrylates, and acrylonitrile and styrene are preferable among them. Specific examples of the polymer polyol (e) include EL-910 manufactured by Asahi Glass Urethane Co., Ltd., EL-923 manufactured by the same company, and FA-728R manufactured by Sanyo Chemical Industries, Ltd.

It is desirable for the polyoxyalkylene polyol (d1) to be contained at a content of at least 30% by mass based on the total quantity of the polyol component (A) to be used. If the content is less than 30% by mass, the quantity of a monool having an unsaturated group at the end is relatively large, and the durability of a flexible polyurethane foam to be obtained may not be improved sufficiently.

It is desirable for the polyoxyalkylene polyol (d2) to be contained at a content of 50 to 100% by mass based on the total quantity of the polyol component (A) to be used. In this case, it is more preferable that the polyol component (A) contain at least one polyol selected from the group consisting of the polyoxyalkylene polyol (d2), a polyoxyalkylene polyol (d) other than (d2), and the polymer polyol (e), and the contents of (d2), (d), and (e) be 50 to 100% by mass, 0 to 10% by mass, and 0 to 50% by mass, respectively, based on the total mass of (d2), (d), and (e).

Next, a flexible foam production method according to the present invention will be described.

The flexible foam production method according to the present invention is characterized in that the composition for flexible polyurethane foam molding according to the present invention, which contains the polyol component (A) and the polyisocyanate component (B), is reacted in the presence of a catalyst (C), water (D) as a blowing agent, and a foam stabilizer (E).

For the catalyst (C) to be used in the present invention, a urethanization catalyst or trimerization catalyst known in the art may be used. Representative examples thereof include tertiary amines such as triethylamine, tripropylamine, tributylamine, N-methylmorpholine, N-ethylmorpholine, dimethylbenzylamine, N,N,N',N'-tetramethylhexamethylenediamine, N,N,N',N',N"-pentamethyldiethylenetriamine, triethylenediamine, bis-(2-dimethyl amino ethyl) ether, and 1,8-diaza-bicyclo(5.4.0)undecene-7; reactive tertiary amines such as dimethylethanolamine, N-trioxyethylene-N,N-dimethylamine, and N,N-dimethyl-N-hexanolamine, and organic acid salts thereof; imidazole compounds such as 1-methylimidazole, 2-methylimidazole, 1,2-dimethylimidazole, 2,4-dimethylimidazole, and 1-butyl-2-methylimidazole; organic metal compounds such as stannous octoate, dibutyltin laurate, and zinc naphthenate; and trimerization catalysts such as 2,4,6-tris(dimethylaminomethyl)phenol, 2,4,6-tris(dialkylaminoalkyl)hexahydro-S-triazines, potassium acetate, and potassium 2-ethylhexanoate.

The type and quantity of the catalyst (C) may be arbitrary and need not to be specified as long as a proper closed cell ratio of foam cells and production cycle can be achieved; however, the preferable quantity of addition is 0.1 to 5 parts by mass based on the polyol from the viewpoint of foam odor, etc.

For the catalyst (C) to be used in the present invention, a reactive amine catalyst (f) having in the molecule a hydroxy group reactive with a polyisocyanate may be used. Examples of such reactive amine catalysts (f) which can be used include 2-hydroxymethyltriethylenediamine, hydroxytriethylenediamine, hydroxymethyltriethylenediamine, hydroxyethyltriethylenediamine, N,N,N'-trimethyl-N'-hydroxyethyl-bisaminoethyl ether, N,N,N'-trimethylaminoethylethanolamine, and N,N-dimethylaminoethoxyethanol. Among them, it is preferable to use 2-hydroxymethyltriethylenediamine or N,N,N'-trimethyl-N'-hydroxyethyl-bisaminoethyl ether. Specific examples include R-ZETA manufactured by Tosoh Corporation and JEFFCAT ZF-10 manufactured by Huntsman Corporation.

The quantity of the reactive amine catalyst (f) to be added is preferably within the range of 0.01 to 5% by mass based on 100% by mass of the polyol component (A). If the quantity is less than 0.01% by mass, the effect of the catalyst may not be obtained. If the quantity is over 5% by mass, on the other hand, the effect owing to an increased quantity of the catalyst cannot be obtained, and in addition the physical properties, in particular the durability, of a polyurethane foam may be deteriorated.

In the case that the reactive amine catalyst (f) is used for the catalyst (C), it is desirable for the polyoxyalkylene polyol (d1) to be contained at a content of at least 30% by mass based on the total quantity of the polyol component (A) to be used.

It is preferable that the mole ratio between all the isocyanate groups in the polyisocyanate component (B) and all groups reactive with an isocyanate group in the compounds reactive with an isocyanate including water (NCOs/groups reactive with NCO) in mixing for foaming be 0.7 to 1.4 [70 to 140 as an isocyanate index (NCO INDEX)], and it is more preferable that the mole ratio (NCOs/groups reactive with NCO) be 0.8 to 1.3 [80 to 130 as an isocyanate index (NCO INDEX)], as a range in which the durability of a foam and the molding cycle are satisfactory, and it is further preferable that the mole ratio (NCOs/groups reactive with NCO) be 0.8 to 1.1 [80 to 110 as an isocyanate index (NCO INDEX)].

If the isocyanate index is lower than 70, lowering of durability may be caused or the number of closed cells may be excessively large, and if the isocyanate index is higher than 140, a prolonged molding cycle due to that an unreacted isocyanate remains for a long period, or the collapse of cells during foaming due to that increase of the molecular weight is retarded may be provided, for example.

For the flexible foam production method according to the present invention, specifically, a flexible polyurethane mold foam (hereinafter, referred to as "flexible mold foam") production method may be used, the method characterized in that a mixed liquid as a raw foaming liquid comprising: the composition for flexible polyurethane foam molding according to the present invention containing the polyol component (A) and the polyisocyanate component (B); the catalyst (C); the water (D) as a blowing agent; and the foam stabilizer (B), is injected into a metal mold, and then cured to foam.

In this case, the temperature of a metal mold in injecting the above raw foaming liquid into the metal mold is typically 30 to 80° C., and preferably 45 to 65° C. If the temperature of a metal mold in injecting the above raw foaming liquid into the metal mold is lower than 30° C., a prolonged molding cycle due to a lowered reaction rate may be provided, and if the temperature is higher than 80° C., a reaction between water and an isocyanate rather than a reaction between a polyol and an isocyanate is excessively accelerated, and as a result the foam may collapse in the course of foaming, or deterioration of the durability or foam texture due to local increase of the number of urea linkages may be caused.

It is preferable that the curing time in curing to form the raw foaming liquid be 10 minutes or shorter, and it is more preferable that the curing time be 7 minutes or shorter, in view of a production cycle for common seat pads, saddles, or the like for vehicles.

In producing the flexible mold foam according to the present invention, the above components may be mixed with a high-pressure foaming machine, a low-pressure foaming machine, or the like, as in the case of a common flexible mold foam.

In this case, it is preferable to mix the polyol component (A) and the polyisocyanate component (B) immediately before foaming. The other components may be mixed with the polyisocyanate component or the polyol component in advance, as long as the temporal variation of the storage stability or reactivity of the raw materials is not affected. The mixture of them may be used immediately after mixing, or a required quantity of the mixture after storing may be appropriately used. In the case of a foaming apparatus having a structure allowing for introducing more than two components into the mixing unit simultaneously, the polyol, blowing agent, polyisocyanate, catalyst, and foam stabilizer, and an additive, etc., may be separately introduced into the mixing unit.

The mixing method may be any of dynamic mixing to mix in a machine head mixing chamber of a foaming machine and static mixing to mix in a feed piping, and both may be used in combination. In many cases, mixing of a gaseous component and a liquid component as in the case of a physical blowing agent or the like is performed with static mixing, and mixing of components capable of being stably stored in liquid is performed with dynamic mixing. It is preferable that a foaming apparatus to be used in the present invention be a high-pressure foaming apparatus, which does not need solvent washing of the mixing unit.

A mixed solution obtained by such mixing is ejected into a metal mold (mold), and cured to foam, and then demolded. To perform the demolding smoothly, it is even suitable to apply a release agent onto the metal mold in advance. For the release agent, a release agent typically used in the field of the molding process is suitably used.

Although the demolded product may be directly used, it is preferable to break the cell film of the foam under compression or reduced pressure by using a conventionally known method to stabilize the appearance and dimensions of a subsequent product.

A first suitable flexible foam with the composition for flexible polyurethane foam molding according to the present invention is characterized in that the apparent density measured in accordance with a method described in JIS K6400 is lower than 55 kg/m$^3$, the 25% compression hardness of the foam test piece with a skin measured in accordance with Method B described in JIS K6400 is 100 to 400 N/314 cm$^2$, the modulus of repulsion elasticity described in JIS K6400 is 45 to 65%, and the hysteresis loss rate measured in accordance with Method B described in JIS K6400 is lower than 28%.

A second suitable flexible foam with the composition for flexible polyurethane foam molding according to the present invention is characterized in that the apparent density measured in accordance with a method described in JIS K6400 is 45 kg/m$^3$ or higher and lower than 75 kg/m$^3$, the 25% compression hardness of the foam test piece with a skin measured in accordance with Method B described in JIS K6400 is 200 to 450 N/314 cm$^2$, the hysteresis loss rate measured in accordance with Method B described in JIS K6400 is lower than 22%, and the residual strain rate after wet-heat compression is lower than 10%; or characterized in that the apparent density is 30 kg/m$^3$ or higher and lower than 45 kg/m$^3$, the 25% compression hardness of the foam test piece with a skin is 80 to 200 N/314 cm$^2$, the hysteresis loss rate is lower than 28%, and the residual strain rate after wet-heat compression is lower than 10%.

A third suitable flexible foam with the composition for flexible polyurethane foam molding according to the present invention is characterized in that the apparent density measured in accordance with a method described in JIS K6400 is lower than 55 kg/m$^3$, the 25% compression hardness of the foam test piece with a skin measured in accordance with Method B described in JIS K6400 is 100 to 400 N/314 cm$^2$, the hysteresis loss rate measured in accordance with Method B described in JIS K6400 is lower than 30%, the strain after wet-heat compression described in JIS K6400 is lower than 12%, and the flexible foam does not cause odor problems and problems relating to toxicity or the environment derived from a catalyst.

If the composition for flexible polyurethane foam molding according to the present invention is used, a flexible foam having these features can be produced easily with the above-described commonly available raw materials, as illustrated in Examples.

EXAMPLES

Hereinafter, the present invention will be described more specifically on the basis of Examples and Comparative Examples, but the present invention is never limited to the following Examples. "Part" and "%" in the text is based on mass unless otherwise specified.

Synthesis of Isocyanate

Isocyanate Synthesis Example I-1

Into a 1 L reactor provided with a stirrer, a thermometer, a condenser, and a nitrogen gas-introducing tube, 658.1 g of diphenylmethane diisocyanate (MDI) containing 1.4% of 2,2'-diphenylmethane diisocyanate (2,2'-MDI) and 43.4% of 2,4'-diphenylmethane diisocyanate (2,4'-MDI) was charged, and the temperature was elevated to 75° C., and 25.6 g of Polyol B1 (average number of functional groups: 2, number average molecular weight: 1000, ethylene oxide unit content: 100%, freezing point: 37° C., PEG-1000 manufactured by Sanyo Chemical Industries, Ltd.) was then charged thereinto, and urethanization reaction was performed for 2 hours while the temperature was maintained and stirring was uniformly performed with a stirring blade. Subsequently, 316.4 g of polyphenylene-polymethylene polyisocyanate (Poly-MDI) containing 39% of MDI in which the 2,2'-MDI and 2,4'-MDI content was 2.5% was charged thereinto, and the resultant was stirred for 30 minutes, and then cooled to room temperature to obtain Isocyanate Group-terminated Prepolymer "I-1" (NCO content: 31.6%). In the composition of the Poly-MDI as the sum total of the MDI charged before the reaction with the PEG-1000 and the Poly-MDI charged after the reaction, the MDI content was 80.2%, and the total content of 2,2'-MDI and 2,4'-MDI in the MDI was 38.1%.

With the same synthesis method, Isocyanate-terminated Prepolymers I-3, 4, 5, 7, 8, 9, 11, 12, 13, and 14, and R-1, 2, 6, 7, 8, 11, 12, 13, and 15 were synthesized. The method in which MDI and a polyol are reacted in advance and then Poly-MDI is added, which was carried out in this Synthesis Example 1, is defined as Synthesis Method 1.

Isocyanate Synthesis Example I-2

Into a 1 L reactor provided with a stirrer, a thermometer, a condenser, and a nitrogen gas-introducing tube, 660.1 g of MDI containing 0.7% of 2,2'-MDI and 24.2% of 2,4'-MDI and 317.4 g of Poly-MDI containing 39% of MDI in which the 2,2'-MDI and 2,4'-MDI content was 2.5% were charged and stirred. In the composition of the Poly-MDI homogenized by stirring, the MDI content was 80.2%, and the total content of 2,2'-MDI and 2,4'-MDI in the MDI was 21.2%. Thereafter, the temperature was elevated to 75° C., and 22.5 g of Polyol B2 (average number of functional groups: 2, number average molecular weight: 600, ethylene oxide unit content: 100%, freezing point: 15° C., PEG-600 manufactured by Sanyo Chemical Industries, Ltd.) was then charged thereinto, and urethanization reaction was performed for 2 hours while the temperature was maintained and stirring was uniformly performed with a stirring blade. Thereafter, the resultant was cooled to room temperature to obtain Isocyanate Group-terminated Prepolymer "I-2" (NCO content: 31.7%).

With the same synthesis method, I-6 and 10, and R-3, 4, and 5 were synthesized. The method in which MDI and Poly-MDI are mixed in advance and then reacted with a polyol, which was carried out in this Synthesis Example 2, is defined as Synthesis Method 2.

Isocyanate Synthesis Example R-15

Into a 1 L reactor provided with a stirrer, a thermometer, a condenser, and a nitrogen gas-introducing tube, 658.1 g of diphenylmethane diisocyanate (MDI) containing 1.4% of 2,2'-diphenylmethane diisocyanate (2,2'-MDI) and 43.4% of 2,4'-diphenylmethane diisocyanate (2,4'-MDI) was charged, and the temperature was elevated to 75° C., and 25.6 g of Polyol F-2 (average number of functional groups: 2, number average molecular weight: 1000, ethylene oxide unit content: 0%, PP-1000 manufactured by Sanyo Chemical Industries, Ltd.) was then charged thereinto, and urethanization reaction was performed for 2 hours while the temperature was maintained and stirring was uniformly performed with a stirring blade. Subsequently, 316.4 g of polyphenylene-polymethylene polyisocyanate (Poly-MDI) containing 39% of MDI in which the 2,2'-MDI and 2,4'-MDI content was 2.5% was charged thereinto, and the resultant was stirred for 30 minutes, and then cooled to room temperature to obtain Isocyanate Group-terminated Prepolymer "I-13" (NCO content: 31.6%). In the composition of the Poly-MDI as the sum total of the MDI charged before the reaction with the PP-1000 and the Poly-MDI charged after the reaction, the MDI content was 80.2%, and the total content of 2,2'-MDI and 2,4"-MDI in the MDI was 38.1%.

Isocyanate Synthesis Example R-16

Isocyanate I-1 and Isocyanate R-15 were blended at a ratio of 1:1 to obtain Isocyanate Group-terminated Prepolymer "R-16". The MDI content was 80.2%, and the total content of 2,2'-MDI and 2,4'-MDI in the MDI was 38.1%.

<Isocyanate R-10>

By blending 597.4 g of MDI in which the content of 2,2'-MDI and 2,4'-MDI was 85.9% and 402.6 g of Poly-MDI in which the MDI content was 39% and the content of 2,2'-MDI and 2,4'-MDI in the MDI was 2.5%, Isocyanate R-10 was obtained. The MDI content was 75.0%, and the total content of 2,2'-MDI and 2,4'-MDI in the MDI was 38.4%.

TABLE 1

|  | Synthesis Example | | | | | | |
|---|---|---|---|---|---|---|---|
|  | Ex. I-1 | Ex. I-2 | Ex. I-3 | Ex. I-4 | Ex. I-5 | Ex. I-6 | Ex. I-7 |
| Name of modified Poly-MDI | I-1 | I-2 | I-3 | I-4 | I-5 | I-6 | I-7 |
| Quantity of raw material MDI charged (g) | 658.1 | 660.1 | 617 | 617 | 626.5 | 460.7 | 702.5 |
| Isomer ratio of raw material MDI (%) | 44.8 | 24.9 | 12.6 | 52.5 | 57.6 | 54 | 43.1 |
| Quantity of raw material Poly-MDI charged (g) | 316.4 | 317.4 | 296.5 | 296.5 | 301.1 | 532.4 | 239.3 |
| MDI content of raw material Poly-MDI (%) | 39 | 39 | 39 | 39 | 39 | 39 | 39 |
| Isomer ratio of raw material Poly-MDI (%) | 2.5 | 2.5 | 2.5 | 2.5 | 2.5 | 2.5 | 2.5 |
| Quantity of modifier charged (g) | 25.6 | 22.5 | 86.5 | 86.5 | 72.5 | 6.9 | 7.6 |
| MDI content (%) | 80.2 | 80.2 | 80.2 | 80.2 | 80.2 | 67.3 | 84.5 |
| Isomer content (%) | 38.1 | 21.2 | 11 | 44.6 | 48.9 | 38 | 38.3 |
| Type of Modifier | b-1 | b-2 | b-3 | b-1 | b-3/b-4 | b-1 | b-3/b-6 |
| EO content of modifier (%)*1 | 100 | 100 | 75 | 100 | 82 | 100 | 97 |
| Freezing point of modifier (° C.) | 37 | 15 | 23 | 37 | 11 | 37 | 44 |
| Number of functional groups of modifier (groups/mol) | 2 | 2 | 2 | 2 | 2 | 2 | 2 |
| Average molecular weight of modifier (—) | 1000 | 600 | 1000 | 1000 | 610 | 1000 | 1410 |
| Synthesis Method | 1 | 2 | 1 | 1 | 1 | 2 | 1 |
| NCO content of modified Poly-MDI (%) | 31.6 | 31.7 | 29.1 | 29.1 | 29.3 | 31.8 | 30.6 |
| Low-temperature storage stability of modified Poly-MDI | A | A | A | A | A | A | A |
| Notes |  |  |  |  | b-3/b-4 = 73/27 |  | b-3/b-6 = 13/87 |

*1 Oxyethylene unit content

TABLE 2

|  | Synthesis Example | | | | | | |
|---|---|---|---|---|---|---|---|
|  | Ex. | Ex. | Ex. | Ex. | Ex. | Ex. | Ex. |
| Name of modified Poly-MDI | I-8 | I-9 | I-10 | I-11 | I-12 | I-13 | I-14 |
| Quantity of raw material MDI charged (g) | 617 | 617 | 626.5 | 460.7 | 702.5 | 428 | 531 |
| Isomer ratio of raw material MDI (%) | 12.6 | 52.5 | 57.6 | 54 | 43.1 | 55 | 44 |
| Quantity of raw material Poly-MDI charged (g) | 296.5 | 296.5 | 301.1 | 532.4 | 239.3 | 501 | 250 |
| MDI content of raw material Poly-MDI (%) | 39 | 39 | 39 | 39 | 39 | 39 | 39 |
| Isomer ratio of raw material Poly-MDI (%) | 2.5 | 2.5 | 2.5 | 2.5 | 2.5 | 4 | 4 |

TABLE 2-continued

|  | Synthesis Example | | | | | | |
|---|---|---|---|---|---|---|---|
|  | Ex. | Ex. | Ex. | Ex. | Ex. | Ex. | Ex. |
| Quantity of modifier charged (g) | 86.5 | 86.5 | 72.5 | 6.9 | 7.6 | 71 | 219 |
| MDI content (%) | 88.8 | 78 | 78.1 | 78.8 | 78.1 | 66.9 | 8 |
| Isomer content (%) | 48.5 | 38 | 20.5 | 37.7 | 37.7 | 49.5 | 38.1 |
| Type of Modifier | b-1/b-7 | b-1/b-5 | b-1/b-8 | b-1/b-8 | b-1/b-7 | b-2 | b-1/b-10 |
| EO content of modifier (%)*1 | 80 | 68 | 99 | 100 | 87 | 100 | 52 |
| Freezing point of modifier (° C.) | 16 | 11 | 33 | 35 | 20 | 15 | −20 |
| Number of functional groups of modifier (groups/mol) | 2.35 | 2 | 1.75 | 1.92 | 2.18 | 2 | 3.1 |
| Average molecular weight of modifier (—) | 1870 | 900 | 920 | 980 | 1450 | 600 | 7360 |
| Synthesis Method | 1 | 1 | 2 | 1 | 1 | 1 | 1 |
| NCO content of modified Poly-MDI (%) | 31.8 | 29.6 | 31.7 | 30.5 | 31.5 | 26.8 | 25 |
| Low-temperature storage stability of modified Poly-MDI | A | A | A | A | A | A | A |
| Notes | b-1/b-7 = 35/65 | b-1/b-5 = 57/43 | b-1/b-8 = 81/19 | b-1/b-8 = 94/6 | b-1/b-7 = 57/43 |  | b-1/b-10 = 9/91 |

*1Oxyethylene unit content

TABLE 3

|  | Synthesis Example | | | | | | | | |
|---|---|---|---|---|---|---|---|---|---|
|  | Ex. | Comp. Ex. | Comp. Ex. | Comp. Ex. | Comp. Ex. | Ex. | Ex. | Comp. Ex. | Comp. Ex. |
| Name of modified Poly-MDI | R-1 | R-2 | R-3 | R-4 | R-5 | R-6 | R-7 | R-8 | R-9 |
| Quantity of raw material MDI charged (g) | 598.9 | 672.7 | 379.8 | 801.4 | 622.2 | 784.8 | 597.4 | 789.8 | Commercially available TDI/MDI blend* |
| Isomer ratio of raw material MDI (%) | 44.8 | 44.8 | 59.6 | 40.5 | 24.4 | 52.5 | 45.8 | 52.5 |  |
| Quantity of raw material Poly-MDI charged (g) | 287.8 | 323.3 | 593.6 | 142.3 | 348.5 | 176.5 | 337 | 177.6 |  |
| MDI content of raw material Poly-MDI (%) | 39 | 39 | 39 | 39 | 39 | 39 | 39 | 39 |  |
| Isomer ratio of raw material Poly-MDI (%) | 2.5 | 2.5 | 2.5 | 2.5 | 2.5 | 2.5 | 2.5 | 2.5 |  |
| Quantity of modifier charged (g) | 113.2 | 4 | 26.6 | 56.2 | 29.3 | 38.7 | 65.7 | 32.5 |  |
| MDI content (%) | 80.2 | 80.2 | 62.8 | 90.8 | 78.1 | 88.8 | 78.0 | 88.8 |  |
| Isomer content (%) | 38.1 | 38.1 | 38.0 | 38.0 | 20.5 | 48.5 | 38.0 | 48.5 |  |
| Type of Modifier | b-1 | b-1 | b-1 | b-1 | b-1/b-8 | b-1/b-7 | b-1/b-5 | b-9 |  |
| EO content of modifier (%)*1 | 100 | 100 | 100 | 100 | 98 | 76 | 62 | 0 |  |
| Freezing point of modifier (° C.) | 37 | 37 | 37 | 37 | 28 | 11 | 2 | −30 |  |
| Number of functional groups of modifier (groups/mol) | 2 | 2 | 2 | 2 | 1.45 | 2.55 | 2 | 2 |  |
| Average molecular weight of modifier (—) | 1000 | 1000 | 1000 | 1000 | 840 | 2380 | 890 | 1000 |  |
| Synthesis Method | 1 | 1 | 2 | 2 | 2 | 1 | 1 | 1 |  |
| NCO content of modified Poly-MDI (%) | 28.0 | 32.5 | 30.8 | 30.8 | 31.4 | 31.6 | 29.8 | 31.7 |  |
| Low-temperature storage stability of modified Poly-MDI | A | A | A | C | A | A | A | A |  |
| Notes |  |  |  | Solidified at 5° C. | b-1/b-8 = 54/46 | b-1/b-7 = 19/81 | b-1/b-5 = 49/51 |  |  |

*Coronate 1021 (TDI/Poly-MDI = 80/20) manufactured by Nippon Polyurethane Industry Co., Ltd.
*1Oxyethylene unit content

TABLE 4

| | Synthesis Example | | | | | |
|---|---|---|---|---|---|---|
| | Comp. Ex. | Comp. Ex. | Ex. | Comp. Ex. | Comp. Ex. | Comp. Ex. |
| Name of modified Poly-MDI | R-10 | R-11 | R-12 | R-13 | R-15 | R-16 |
| Quantity of raw material MDI charged (g) | 597.4 | 534.5 | 624 | 502.7 | 658.1 | 658.1 |
| Isomer ratio of raw material MDI (%) | 85.9 | 44.1 | 44.2 | 27.2 | 44.8 | 44.8 |
| Quantity of raw material Poly-MDI charged (g) | 402.6 | 252.1 | 321.5 | 286.5 | 316.4 | 316.4 |
| MDI content of raw material Poly-MDI (%) | 39 | 39 | 39 | 39 | 39 | 39 |
| Isomer ratio of raw material Poly-MDI (%) | 2.5 | 4 | 4 | 4 | 2.5 | 2.5 |
| Quantity of modifier charged (g) | 0 | 213.4 | 54.5 | 210.9 | 25.6 | 25.6 |
| MDI content (%) | 75.0 | 80.2 | 78.8 | 78.0 | 80.2 | 80.2 |
| Isomer content (%) | 38.4 | 38.1 | 37.7 | 22.0 | 38.1 | 38.1 |
| Type of Modifier | — | b-1 | b-1/b-8 | b-11/b-7 | b-9 | b-1/b-9 |
| EO content of modifier (%)*1 | — | 100 | 100 | 46 | 0 | 50 |
| Freezing point of modifier (° C.) | — | 37 | 36 | 0 or lower | −30 or lower | 36 |
| Number of functional groups of modifier (groups/mol) | — | 2.0 | 1.9 | 3.0 | 2.0 | 2.0 |
| Average molecular weight of modifier (—) | — | 1000 | 980 | 4078 | 1000 | 1000 |
| Synthesis Method | — | 1 | 1 | 1 | 1 | 1 |
| NCO content of modified Poly-MDI (%) | 32.5 | 24.0 | 30.5 | 25.0 | 31.6 | 31.6 |
| Low-temperature storage stability of modified Poly-MDI | A | A | A | A | A | A |
| Notes | Unmodified | | b-1/b-8 = 94/6 | b-11/b-7 = 51/49 | | b-1/b-9 = 50/50 |

*1Oxyethylene unit content

TABLE 5

| Name of polyol | EO unit content (%) | Average molecular weight (g/mol) | Average number of functional groups (groups/mol) | Freezing point (° C.) | Notes |
|---|---|---|---|---|---|
| b-1 | 100 | 1000 | 2 | 37 | PEG-1000, from Sanyo Chemical Industries, Ltd. |
| b-2 | 100 | 600 | 2 | 15 | PEG-600, from Sanyo Chemical Industries, Ltd. |
| b-3 | 75 | 1000 | 2 | 23 | UNILUBE 75DE-15, from NOF CORPORATION |
| b-4 | 100 | 300 | 2 | −20 | PEG-300, from Sanyo Chemical Industries, Ltd. |
| b-5 | 25 | 800 | 2 | −25 | UNILUBE 25DE-10, from NOF CORPORATION |
| b-6 | 100 | 1500 | 2 | 47 | PEG-1540, from Sanyo Chemical Industries, Ltd. |
| b-7 | 70 | 3500 | 3 | 3 | SANNIX FA-103, from Sanyo Chemical Industries, Ltd. |
| b-8 | 96 | 700 | 1 | 25 | MPG-081, from Nippon Nyukazai Co., Ltd. |
| b-9 | 0 | 1000 | 2 | −30 or lower | SANNIX PP-1000, from Sanyo Chemical Industries, Ltd. |
| b-10 | 14 | 8000 | 4 | −20 or lower | EXCENOL EL-838, from ASAHI GLASS CO., LTD. |
| b-11 | 13 | 5000 | 3 | 0 or lower | SANNIX FA-703, from Sanyo Chemical Industries, Ltd. |

[Preparation of Polyol Premix]

To a 100 L mixing machine provided with a stirrer, polyols (d), (d1), and (d2), and a catalyst (C), water (D) as a blowing agent, and a foam stabilizer (E) were charged in quantities as listed in Tables 6 to 8 and Tables 12 to 14, and homogeneously mixed.

TABLE 6

| | \multicolumn{7}{c}{Name of premix} |
|---|---|---|---|---|---|---|---|
| | P-1 | P-2 | P-3 | P-4 | P-5 | P-6 | P-7 |
| d-1 | 100 | 85 | 30 | | | | 75 |
| d-2 | | | | 80 | | | |
| d-3 | | | 45 | | 60 | 60 | |
| d-4 | 5 | 5 | 3 | 2 | 3 | 3 | 3 |
| e-1 | | 10 | 25 | 20 | 37 | 37 | 25 |
| b-1 | | | | | | | 3 |
| C-1 | 0.5 | 0.45 | 0.4 | 0.5 | 0.5 | 0.5 | 0.5 |
| C-2 | 0.1 | 0.05 | 0.1 | 0.3 | 0.05 | 0.05 | 0.1 |
| E-1 | 1 | 1 | 1 | 1 | | 1 | 1 |
| E-2 | | | | | 1 | | |
| D (water) | 4 | 3.5 | 3.5 | 4 | 3.4 | 3.4 | 4.0 |

TABLE 7

| | \multicolumn{6}{c}{Name of premix} |
|---|---|---|---|---|---|---|
| | P-8 | P-9 | P-10 | P-11 | P-12 | P-13 |
| d2-1 | 95 | 85 | | 60 | 70 | |
| d2-2 | | | 78 | | | 90 |
| d-4 | 5 | 5 | 2 | 3 | 5 | 3 |
| e-1 | | 10 | 20 | | 25 | 10 |
| e-2 | | | | 37 | | |
| C-1 | 0.5 | 0.45 | 0.5 | 0.5 | 0.5 | 0.5 |
| C-2 | 0.1 | 0.05 | 0.3 | 0.05 | 0.1 | 0.05 |
| E-3 | 1.0 | 1.0 | 1.0 | 1.0 | 1.0 | |
| E-2 | | | | | | 1.0 |
| D (water) | 4.0 | 3.5 | 4.0 | 3.4 | 2.5 | 5.0 |

TABLE 8

| | \multicolumn{6}{c}{Name of premix} |
|---|---|---|---|---|---|---|
| | P-14 | P-15 | P-16 | P-17 | P-18 | P-19 |
| d-1 | 95 | 85 | | 60 | 70 | |
| d-2 | | | 78 | | | 90 |
| d-4 | 5 | 5 | 2 | 3 | 5 | |
| e-1 | | 10 | 20 | | 25 | 10 |
| e-2 | | | | 37 | | |
| C-1 | 0.5 | 0.45 | 0.5 | 0.5 | 0.5 | 0.5 |
| C-2 | 0.1 | 0.05 | 0.3 | 0.05 | 0.1 | 0.05 |
| E-3 | 1.0 | 1.0 | 1.0 | 1.0 | 1.0 | |
| E-2 | | | | | | 1.0 |
| D (water) | 4.0 | 3.5 | 4.0 | 3.4 | 2.5 | 5.0 |

Polyol d-1: polyoxyethylene-polyoxypropylene polyol with average number of functional groups of polymerization initiator=3.0, hydroxyl value=28 (mgKOH/g), and total degree of unsaturation of 0.09 meq./g, SANNIX FA-921 manufactured by Sanyo Chemical Industries, Ltd.

Polyol d-2: polyoxyethylene-polyoxypropylene polyol with average number of functional groups of polymerization initiator=3.0, hydroxyl value=34 (mgKOH/g), and total degree of unsaturation of 0.10 meq./g, SANNIX FA-703 manufactured by Sanyo Chemical Industries, Ltd.

Polyol d-3: polyoxyethylene-polyoxypropylene polyol with average number of functional groups of polymerization initiator=4M, hydroxyl value=28 (mgKOH/g), and total degree of unsaturation of 0.07 meq./g, EXCENOL 838 manufactured by ASAHI GLASS CO., LTD.

Polyol d-4: polyoxyethylene-polyoxypropylene polyol with average number of functional groups of polymerization initiator=3.0, hydroxyl value=48 (mgKOH/g), and total degree of unsaturation 0.01 meq./g, SANNIX FA-103 manufactured by Sanyo Chemical Industries, Ltd.

Polyol d1-1: two types of polyoxyalkylene polyols produced with an imino group-containing phosphazenium salt as a catalyst were blended, and adjusted so as to reach hydroxyl value=104 (mgKOH/g), a total degree of unsaturation of 0.03 meq./g, and the terminal primary hydroxylation rate of 58%.

Polyol d1-2: two types of polyoxyalkylene polyols produced with an imino group-containing phosphazenium salt as a catalyst were blended, and adjusted so as to reach hydroxyl value=98 (mgKOH/g), a total degree of unsaturation of 0.03 meq./g, and the terminal primary hydroxylation rate of 60%.

Polyol d1-3: two types of polyoxyalkylene polyols produced with an imino group-containing phosphazenium salt as a catalyst were blended, and adjusted so as to reach hydroxyl value=38 (mgKOH/g), a total degree of unsaturation of 0.03 meq./g, and a terminal primary hydroxylation rate of 80%.

Polyol d1-4: two types of polyoxyalkylene polyols produced with an imino group-containing phosphazenium salt as a catalyst were blended, and adjusted so as to reach hydroxyl value=38 (mgKOH/g), a total degree of unsaturation of 0.03 meq./g, and a terminal primary hydroxylation rate of 90%.

Polyol d1-5: two types of polyoxyalkylene polyols produced with an imino group-containing phosphazenium salt as a catalyst were blended, and adjusted so as to reach hydroxyl value=17 (mgKOH/g), a total degree of unsaturation of 0.03 meq./g, and a terminal primary hydroxylation rate of 88%.

Polyol d1-6: two types of polyoxyalkylene polyols produced with an imino group-containing phosphazenium salt as a catalyst were blended, and adjusted so as to reach hydroxyl value=20 (mgKOH/g), a total degree of unsaturation of 0.03 meq./g, and a terminal primary hydroxylation rate of 87%.

Polyol d1-7: two types of polyoxyalkylene polyols produced with an imino group-containing phosphazenium salt as a catalyst were blended, and adjusted so as to reach hydroxyl value=38 (mgKOH/g), a total degree of unsaturation of 0.03 meq./g, and a terminal primary hydroxylation rate of 81%.

Polyol d1-8: two types of polyoxyalkylene polyols produced with an imino group-containing phosphazenium salt as a catalyst were blended, and adjusted so as to reach hydroxyl value=48 (mgKOH/g), a total degree of unsaturation of 0.03 meq./g, and a terminal primary hydroxylation rate of 78%.

Polyol d1-9: two types of polyoxyalkylene polyols produced with an imino group-containing phosphazenium salt as a catalyst were blended, and adjusted so as to reach hydroxyl value=52 (mgKOH/g), a total degree of unsaturation of 0.03 meq./g, and a terminal primary hydroxylation rate of 76%.

Polyol d1-10: two types of polyoxyalkylene polyols produced with an imino group-containing phosphazenium salt as a catalyst were blended, and adjusted so as to reach hydroxyl value=47 (mgKOH/g), a total degree of unsaturation of 0.009 meq./g, and a terminal primary hydroxylation rate of 87%.

Polyol d1-11: two types of polyoxyalkylene polyols produced with an imino group-containing phosphazenium salt as a catalyst were blended, and adjusted so as to reach hydroxyl value=24 (mgKOH/g), a total degree of unsaturation of 0.03 meq./g, and a terminal primary hydroxylation rate of 85%.

Polyol d1-12: two types of polyoxyalkylene polyols produced with an imino group-containing phosphazenium salt and KOH as catalysts were blended, and adjusted so as to reach hydroxyl value=28 (mgKOH/g), a total degree of unsaturation of 0.05 meq./g, and a terminal primary hydroxylation rate of 87%.

Polyol d2-1: polyoxyalkylene polyol produced with an imino group-containing phosphazenium salt as a catalyst, with hydroxyl value=24.5 (mgKOH/g), a total degree of unsaturation of 0.026 meq./g, and an average number of functional groups of 3.

Polyol d2-2: polyoxyalkylene polyol produced with an imino group-containing phosphazenium salt as a catalyst, with hydroxyl value=20.2 (mgKOH/g), a total degree of unsaturation of 0.028 meq./g, and an average number of functional groups of 3.

Polyol d3: polymer polyol produced with KOH as a catalyst, with average number of functional groups=3.0 and hydroxyl value=28 (mgKOH/g).

Polyol d4: polyoxyethylene-polyoxypropylene polyol produced with KOH as a catalyst, with average number of functional groups of polymerization initiator=3.0 and hydroxyl value=48 (mgKOH/g).

<Polymer Polyol e>

Polyol e-1: polymer polyol with average number of functional groups=3.0 and hydroxyl value=28 (mgKOH/g), SANNIX FA-728R manufactured by Sanyo Chemical Industries, Ltd.

Polyol e-2: polymer polyol with average number of functional groups=3.0 and hydroxyl value=28 (mgKOH/g), EXCENOL EL-923 manufactured by ASAHI GLASS CO., LTD.

<Polyol b (Modifier)>

Polyols b used for modification of MDI are listed in Table 5.

<Catalyst C>

C-1: 33% dipropylene glycol solution of triethylenediamine, TEDA-L33 manufactured by Tosoh Corporation C-2: 70% dipropylene glycol solution of bis(2-dimethylaminoethyl) ether, TOYOCAT-ET manufactured by Tosoh Corporation C-3: 2-hydroxymethyltriethylenediamine, R-ZETA manufactured by Tosoh Corporation C-4: N, N, N'-trimethyl-N-hydroxyethyl-bisaminoethyl ether, JEFFCAT ZF-10 manufactured by Huntsman Corporation.

<Blowing Agent (D)> water.

<Foam Stabilizer (E)>

E-1: silicone foam stabilizer, B-8715LF2 manufactured by Evonik Industries AG

E-2: silicone foam stabilizer, B-8724LF2 manufactured by Evonik Industries AG

E-3: silicone foam stabilizer, SZ-1327 manufactured by Dow Corning Toray Co., Ltd.

E-4: silicone foam stabilizer, L-5309 manufactured by Momentive Performance Materials Inc.

TABLE 9

|  | Ex. K-1 | Ex. K-2 | Ex. K-3 | Ex. K-4 | Ex. K-5 | Ex. K-6 | Ex. K-7 | Ex. K-8 |
|---|---|---|---|---|---|---|---|---|
| Isocyanate | I-1 | I-2 | I-3 | I-4 | I-5 | I-6 | I-7 | I-8 |
| Polyol premix | P-1 | P-2 | P-3 | P-4 | P-5 | P-5 | P-1 | P-1 |
| Isocyanate index | 110 | 95 | 115 | 100 | 70 | 81 | 120 | 138 |
| Core apparent density (kg/m$^3$) | 50 | 45 | 45 | 45 | 50 | 43 | 46 | 45 |
| 25% ILD (N/314 cm$^2$) | 225 | 200 | 260 | 241 | 101 | 115 | 243 | 338 |
| Hysteresis loss rate (%) | 24.3 | 24 | 25.2 | 25.6 | 23.7 | 21.5 | 26.8 | 27.8 |
| Modulus of repulsion elasticity (%) | 59 | 63 | 59 | 57 | 64 | 65 | 58 | 56 |
| Tensile Strength (kPa) | 125 | 116 | 172 | 168 | 102 | 110 | 178 | 195 |
| Elongation (%) | 110 | 107 | 105 | 120 | 106 | 105 | 103 | 95 |
| Tearing strength (N/cm) | 6.7 | 6.2 | 8 | 8.3 | 6.1 | 6.7 | 8.1 | 9.5 |
| Strain after wet-heat compression (%) | 6.1 | 6 | 8.1 | 8.2 | 7.6 | 6 | 8.7 | 9.8 |

TABLE 10

|  | Ex. K-9 | Ex. K-10 | Ex. K-11 | Ex. K-12 | Comp. Ex. K-13 | Comp. Ex. K-14 | Ex. K-15 | Comp. Ex. K-16 |
|---|---|---|---|---|---|---|---|---|
| Isocyanate | I-9 | I-10 | I-11 | I-12 | R-9 | R-9 | R-1 | R-2 |
| Polyol premix | P-5 | P-5 | P-5 | P-5 | P-6 | P-5 | P-1 | P-1 |
| Isocyanate index | 100 | 95 | 95 | 95 | 110 | 110 | 90 | 110 |
| Core apparent density (kg/m$^3$) | 54 | 45 | 43 | 50 | 45 | 45 | 62 | 50 |
| 25% ILD (N/314 cm$^2$) | 270 | 215 | 230 | 245 | 220 | 225 | 234 | 236 |
| Hysteresis loss rate (%) | 26.1 | 24.3 | 24.6 | 23.8 | 21 | 26 | 22.3 | 30.1 |
| Modulus of repulsion elasticity (%) | 58 | 60 | 62 | 63 | 75 | 65 | 61 | 53 |
| Tensile Strength (kPa) | 128 | 118 | 120 | 125 | 125 | 156 | 149 | 133 |

TABLE 10-continued

|  | Ex. K-9 | Ex. K-10 | Ex. K-11 | Ex. K-12 | Comp. Ex. K-13 | Comp. Ex. K-14 | Ex. K-15 | Comp. Ex. K-16 |
|---|---|---|---|---|---|---|---|---|
| Elongation (%) | 112 | 126 | 118 | 108 | 110 | 127 | 105 | 103 |
| Tearing strength (N/cm) | 7.5 | 7.4 | 6.9 | 7.2 | 7.9 | 8.3 | 6.7 | 6.8 |
| Strain after wet-heat compression (%) | 6.3 | 7.8 | 6.8 | 5.7 | 15.6 | 24.8 | 6.2 | 14.5 |

TABLE 11

|  | Comp. Ex. K-17 | Comp. Ex. K-18 | Ex. K-19 | Ex. K-20 | Comp. Ex. K-21 | Comp. Ex. K-22 |
|---|---|---|---|---|---|---|
| Isocyanate | R-3 | R-5 | R-6 | R-7 | R-8 | R-10 |
| Polyol premix | P-1 | P-2 | P-3 | P-4 | P-1 | P-7 |
| Isocyanate index | 100 | 95 | 115 | 100 | 138 | 95 |
| Core apparent density (kg/m$^3$) | 45 | 46 | 45 | 45 | 44 | 46 |
| 25% ILD (N/314 cm$^2$) | 248 | 200 | 268 | 244 | 325 | 230 |
| Hysteresis loss rate (%) | 24.1 | 30.6 | 24.8 | 30.8 | 34.5 | 31.5 |
| Modulus of repulsion elasticity (%) | 61 | 52 | 61 | 54 | 52 | 62 |
| Tensile Strength (kPa) | 120 | 101 | 178 | 120 | 188 | 126 |
| Elongation (%) | 78 | 128 | 79 | 122 | 93 | 93 |
| Tearing strength (N/cm) | 4.1 | 5.9 | 4.3 | 8.3 | 9.1 | 4.8 |
| Strain after wet-heat compression (%) | 6.2 | 14.6 | 6.2 | 15.2 | 18.8 | 9.6 |

TABLE 12

|  |  | Ex. K-23 | Ex. K-24 | Ex. K-25 | Ex. K-26 |
|---|---|---|---|---|---|
| Isocyanate (B) |  | I-1 | I-1 | I-1 | I-1 |
| Polyol (A) | d1-11 | 75 | 75 | 75 | 75 |
|  | d3 | 25 | 25 | 25 | 25 |
|  | d4 | 4 | 4 | 4 | 4 |
| Amine catalyst (C) | C-1 |  | 0.35 | 0.35 |  |
|  | C-2 |  | 0.08 |  | 0.08 |
|  | C-3 | 0.7 |  |  | 0.7 |
|  | C-4 | 0.18 |  | 0.18 |  |
| Foam stabilizer (E) | E-4 | 1 | 1 | 1 | 1 |
| Blowing agent (D) | Water | 4 | 4 | 4 | 4 |
| Isocyanate index |  | 90 | 90 | 90 | 90 |
| Gel time (S) |  | 84 | 85 | 84 | 84 |
| Rise time (S) |  | 104 | 108 | 107 | 106 |
| Apparent density (kg/m$^3$) |  | 50 | 50 | 50 | 50 |
| 25% ILD (N/314 cm$^2$) |  | 241 | 245 | 244 | 242 |

TABLE 12-continued

|  | Ex. K-23 | Ex. K-24 | Ex. K-25 | Ex. K-26 |
|---|---|---|---|---|
| Hysteresis loss rate (%) | 28.4 | 28.4 | 29 | 28.9 |
| Strain after wet-heat compression (%) | 9.2 | 8.6 | 8.8 | 9.3 |
| Odor | A | C | B | B |
| Foam moldability | A | A | A | A |

TABLE 13

|  |  | Ref. Ex. K-27 | Ref. Ex. K-28 | Ex. K-29 | Ex. K-30 |
|---|---|---|---|---|---|
| Isocyanate (B) |  | I-1 | I-1 | I-1 | I-1 |
| Polyol (A) | d1-1 | 75 |  |  |  |
|  | d1-2 |  | 75 |  |  |
|  | d1-3 |  |  | 75 |  |
|  | d1-4 |  |  |  | 75 |
|  | d3 | 25 | 25 | 25 | 25 |
|  | d4 | 4 | 4 | 4 | 4 |
| Amine catalyst (C) | C-3 | 0.7 | 0.7 | 0.7 | 0.7 |
|  | C-4 | 0.18 | 0.18 | 0.18 | 0.18 |
| Foam stabilizer (E) | E-4 | 1 | 1 | 1 | 1 |
| Blowing agent (D) | Water | 4 | 4 | 4 | 4 |
| Isocyanate index |  | 90 | 90 | 90 | 90 |
| Apparent density (kg/m$^3$) |  | — | 50 | 50 | 50 |
| 25% ILD (N/314 cm$^2$) |  | — | 295 | 244 | 242 |
| Hysteresis loss rate (%) |  | — | 38.2 | 27.4 | 27.7 |
| Strain after wet-heat compression (%) |  | — | 14.5 | 8.8 | 9.3 |
| Odor |  | — | A | A | A |
| Foam moldability |  | C (collapsed) | A | A | A |

TABLE 14

|  |  | Ref. Ex. K-31 | Ex. K-32 | Ex. K-33 | Ex. K-34 | Ref. Ex. K-35 |
|---|---|---|---|---|---|---|
| Isocyanate (B) |  | I-1 | I-1 | I-1 | I-1 | I-1 |
| Polyol (A) | d1-5 | 75 |  |  |  |  |
|  | d1-6 |  | 76 |  |  |  |
|  | d1-7 |  |  | 75 |  |  |
|  | d1-8 |  |  |  | 75 |  |
|  | d1-9 |  |  |  |  | 75 |
|  | d3 | 25 | 25 | 25 | 25 | 25 |
|  | d4 | 4 | 4 | 4 | 4 | 4 |
| Amine catalyst (C) | C-3 | 0.7 | 0.7 | 0.7 | 0.7 | 0.7 |
|  | C-4 | 0.18 | 0.18 | 0.18 | 0.18 | 0.18 |
| Foam stabilizer (E) | E-4 | 1 | 1 | 1 | 1 | 1 |

TABLE 14-continued

|  | Ref. Ex. K-31 | Ex. K-32 | Ex. K-33 | Ex. K-34 | Ref. Ex. K-35 |
|---|---|---|---|---|---|
| Blowing agent Water (D) | 4 | 4 | 4 | 4 | 4 |
| Isocyanate index | 90 | 90 | 90 | 90 | 90 |
| Apparent density (kg/m³) | 50 | 50 | 50 | 50 | 50 |
| 25% ILD (N/314 cm²) | — | 245 | 257 | 268 | 273 |
| Hysteresis loss rate (%) | — | 27.4 | 28 | 29.6 | 33.6 |
| Strain after wet-heat compression (%) | — | 6.6 | 8.8 | 9.3 | 12.2 |
| Odor | — | A | A | A | A |
| Foam moldability | C (collapsed) | A | A | A | A |

TABLE 15

|  |  | Ex. K-36 | Ex. K-37 | Ref. Ex. K-38 | Comp. Ex. K-39 | Comp. Ex. K-40 |
|---|---|---|---|---|---|---|
| Isocyanate (B) |  | I-1 | I-1 | I-1 | R-15 | R-16 |
| Polyol (A) | d1-10 | 75 |  |  |  |  |
|  | d1-11 |  | 75 |  | 75 | 75 |
|  | d1-12 |  |  | 75 |  |  |
|  | d3 | 25 | 25 | 25 | 25 | 25 |
|  | d4 | 4 | 4 | 4 | 4 | 4 |
| Amine catalyst (C) | C-3 | 0.7 | 0.7 | 0.7 | 0.7 | 0.7 |
|  | C-4 | 0.18 | 0.18 | 0.18 | 0.18 | 0.18 |
| Foam stabilizer (E) | E-4 | 1 | 1 | 1 | 1 | 1 |
| Blowing agent (D) | Water | 4 | 4 | 4 | 4 | 4 |
| Isocyanate index |  | 90 | 90 | 90 | 90 | 90 |
| Apparent density (kg/m³) |  | 50 | 50 | 50 | — | 50 |
| 25% ILD (N/314 cm²) |  | 270 | 252 | 256 | — | 262 |
| Hysteresis loss rate (%) |  | 23.1 | 26.4 | 34.3 | — | 32.1 |
| Strain after wet-heat compression (%) |  | 5.3 | 7.6 | 12.6 | — | 10.3 |
| Odor |  | A | A | A | — | A |
| Foam moldability |  | A | A | A | C (collapsed) | A |

TABLE 16

|  | Ex. K-41 | Ex. K-42 | Ex. K-43 | Ex. K-44 | Ex. K-45 | Ex. K-46 | Ex. K-47 |
|---|---|---|---|---|---|---|---|
| Isocyanate | I-1 | I-2 | I-3 | I-4 | I-5 | I-1 | I-8 |
| Polyol premix | P-8 | P-9 | P-10 | P-11 | P-12 | P-13 | P-8 |
| Isocyanate index | 110 | 95 | 105 | 100 | 90 | 80 | 105 |
| Core apparent density (kg/m³) | 50 | 45 | 60 | 55 | 75 | 38 | 43 |
| 25% ILD (N/314 cm²) | 310 | 238 | 260 | 248 | 390 | 143 | 198 |
| Hysteresis loss rate (%) | 22.0 | 20.2 | 19.2 | 21.4 | 18.1 | 27.8 | 25.8 |
| Modulus of repulsion elasticity (%) | 64 | 65 | 62 | 61 | 65 | 57 | 56 |
| Tensile Strength (kPa) | 132 | 120 | 172 | 177 | 144 | 139 | 195 |
| Elongation (%) | 115 | 119 | 105 | 107 | 106 | 124 | 95 |
| Tearing strength (N/cm) | 6.7 | 6.5 | 8.0 | 4.6 | 5.4 | 5.6 | 9.5 |
| Strain after wet-heat compression (%) | 5.8 | 5.6 | 5.1 | 7.3 | 3.3 | 9.3 | 9.8 |

TABLE 17

|  | Ex. K-48 | Ex. K-49 | Ex. K-50 | Ex. K-51 | Ref. Ex. K-52 | Ref. Ex. K-53 | Comp. Ex. K-54 |
|---|---|---|---|---|---|---|---|
| Isocyanate | I-1 | I-2 | I-3 | I-4 | I-1 | I-8 | R-11 |
| Polyol premix | P-14 | P-15 | P-16 | P-17 | P-19 | P-14 | P-8 |
| Isocyanate index | 110 | 95 | 105 | 100 | 80 | 105 | 110 |
| Core apparent density (kg/m³) | 50 | 45 | 60 | 55 | 38 | 43 | Metal mold could not be filled at density of 45 kg/m³ |
| 25% ILD (N/314 cm²) | 225 | 200 | 241 | 209 | 116 | 162 |  |
| Hysteresis loss rate (%) | 24.3 | 24.0 | 25.6 | 25.4 | 32.5 | 30.8 |  |
| Modulus of repulsion elasticity (%) | 59 | 63 | 57 | 60 | 55 | 53 |  |
| Tensile Strength (kPa) | 125 | 116 | 158 | 167 | 121 | 160 |  |
| Elongation (%) | 110 | 107 | 101 | 106 | 114 | 88 |  |
| Tearing strength (N/cm) | 6.7 | 6.2 | 8.3 | 4.4 | 4.1 | 6.5 |  |
| Strain after wet-heat compression (%) | 6.1 | 6.0 | 8.2 | 9.8 | 12.6 | 13.5 |  |

TABLE 18

|  | Comp. Ex. K-55 | Comp. Ex. K-56 | Comp. Ex. K-57 | Comp. Ex. K-58 | Comp. Ex. K-59 | Comp. Ex. K-60 |
|---|---|---|---|---|---|---|
| Isocyanate | R-2 | R-3 | R-12 | R-8 | R-13 | R-9 |
| Polyol premix | P-8 | P-8 | P-11 | P-8 | P-9 | P-13 |
| Isocyanate index | 110 | 100 | 85 | 138 | 85 | 105 |
| Core apparent density (kg/m³) | 50 | 45 | 41 | 46 | 56 | 37 |
| 25% ILD (N/314 cm²) | 236 | 248 | 150 | 325 | 313 | 95 |
| Hysteresis loss rate (%) | 30.1 | 24.1 | 28.6 | 34.5 | 31.7 | 33.0 |
| Modulus of repulsion elasticity (%) | 53 | 61 | 59 | 52 | 57 | 69 |
| Tensile Strength (kPa) | 133 | 120 | 115 | 188 | 140 | 156 |
| Elongation (%) | 103 | 78 | 114 | 93 | 140 | 127 |
| Tearing strength (N/cm) | 6.8 | 4.1 | 5.9 | 9.1 | 4.7 | 8.3 |
| Strain after wet-heat compression (%) | 14.5 | 6.2 | 15.8 | 18.8 | 8.2 | 24.8 |

[Foam Molding]

Foaming Conditions

Metal mold temperature: 55 to 60° C.

Metal mold shape: 100×300×300 mm

Metal mold material: aluminum

Cure conditions: 55 to 60° C.×4 minutes.

[Foam Formation Method]

The solution temperature of a polyol premix and a synthesized isocyanate group-terminated prepolymer or commercially available TDI/MID blend isocyanate was adjusted to 25±1° C. An isocyanate group-terminated prepolymer or commercially available TDI/MID blend isocyanate was mixed with a polyol premix at a ratio so as to reach an isocyanate index value listed in Table 9 to Table 18, and the resultant was mixed with a mixer at a rotation frequency of 7000 rpm for 7 seconds, injected into a metal mold to foam a flexible foam, and then removed from the metal mold, and the cells were broken by roller crushing, and thereafter the physical properties of the resultant flexible foam were measured.

<Method of Measuring Physical Properties of Polyurethane Foam>

The apparent density, tensile strength, elongation, tearing strength, modulus of repulsion elasticity, and residual strain after wet-heat compression were each measured in accordance with a method described in JIS K6400, the residual strain after compression was measured in accordance with Method A described in JIS K6400, the 25% compression hardness of a foam test piece with a skin was measured in accordance with Method B described in JIS K6400, the hysteresis loss rate was measured in accordance with Method B described in JIS K6400, and the residual strain after wet-heat was measured in accordance with a method described in JIS K6400.

Evaluation on the odor was performed with the odor sensor COSMOXP-329 manufactured by NEW COSMOS ELECTRIC CO., LTD. The odor of a foam sample was measured over time under conditions of 20° C. and 55% RH, and the time required for the numerical value of the odor to be reduced to the level of the measurement environment was determined. A sample whose odor was reduced to the level of the measurement environment within 10 hours was rated as "A", a sample whose odor was reduced to the level of the measurement environment within 24 hours was rated as "B", and a sample whose odor was not reduced to the level of the measurement environment even after 100 hours was rated as "C".

As is clear from the results shown in Table 9 to Table 11, it was confirmed that each of Examples of the flexible polyurethane foams obtained by using the polyisocyanate composition according to the present invention in accordance with the method according to the present invention exhibits well-balanced, satisfactory physical properties by virtue of pseudo-crosslinking through the agglomeration of oxyethylene glycol units.

In the case of the TDI/MDI blend isocyanate commonly used, as Comparative Examples K-13 and 14, the modulus of repulsion elasticity is excessively high and a satisfactory vibration-absorbing performance is not exhibited if any special measure is not taken. If the modulus of repulsion elasticity is lowered through lowering of the air permeability, on the other hand, deterioration of the static durability is significant although the hysteresis loss is relatively low, and if Comparative Example K-13 or 14 is used for a flexible foam for vehicles, the viewpoint of a driver changes in a long driving, and a problem with safety may be presented.

In Comparative Example K-16, in which the setting of the NCO content was high, the quantity of a polyol having an oxyethylene glycol unit was small, and as a result the crosslinking effect due to the agglomeration was low and the hysteresis loss was high.

In the case that the MDI content is lowered as in the case of Comparative Example K-17, the chemical crosslinking density in the flexible foam resin is excessively high, and the mechanical strength of the foam is deteriorated although a low hysteresis loss rate and a high durability can be achieved.

In the case that the number of functional groups of a polyol as a modifier is set low as in the case of Comparative Example K-18, the chemical crosslinking density in the flexible foam resin is lowered, the hysteresis loss rate increases, and the durability is deteriorated.

The modifier used for. Comparative Example K-21 contains no polyoxyethylene unit and has a freezing point being out of the range of 10 to 45° C., and is liquid at normal temperature. As a result, the crosslinking effect due to the agglomeration was low and the hysteresis loss was high.

In Comparative Example K-22, MDI was not modified, and a modifier was mixed with a polyol premix and foamed. As a result, the hysteresis loss was high. In addition, the storage stability of the polyol premix was deteriorated.

As is clear from the result shown in Table 12, it wad confirmed that Example K-23, which had a composition of combination of 2-hydroxymethyltriethylenediamine, as a reactive amine catalyst having in the molecule a hydroxy group reactive with a polyisocyanate, and N,N,N'-trimethyl-N'-hydroxyethyl-bisaminoethyl ether, has less odor. In addition, it was confirmed that combination of the specific polyol component and polyisocyanate component described in the present application provides a foam having a satisfactory hysteresis loss and durability even in a low density region. In the case of Example K-24, the foam physical properties are satisfactory although odor derived from the amine catalyst remains in the foam.

It can be appreciated that, in the case that the terminal primary hydroxylation rate is excessively low, as Reference Examples K-27 and 28 in Table 13, the mold stability of the foam is insufficient, and a satisfactory flexible foam may not be obtained.

It can be appreciated that, in the case that setting of the hydroxyl value is excessively low, as Reference Example K-31 in Table 14, the viscosity of the polyol is excessively high to deteriorate flowability, and the filling properties of the flexible foam are degraded, and a satisfactory flexible foam may not be obtained.

It can be appreciated that, in the case that setting of the hydroxyl value is excessively high, as Reference Example K-35, the hardness of the flexible foam is excessively high, and the softness is lowered, and a satisfactory hysteresis loss may not be obtained.

It can be appreciated that, in the case that setting of the total degree of unsaturation is excessively high, as Reference Example K-38 in Table 15, the crosslinking density of the flexible foam is lowered, and a satisfactory hysteresis loss and durability may not be obtained.

In the case of Comparative Example K-39, a polyethylene glycol was not used as a modifier, and thus the molding stability of the foam was lowered, and a satisfactory foam could not be obtained. In the case of Comparative Example K-40, the crosslinking effect due to the agglomeration of oxyethylene glycol units was low, and as a result the hysteresis loss was high.

As is clear from the result shown in Table 16, it was confirmed that each of Examples K-41 to K-47 of flexible polyurethane foams with the polyisocyanate composition according to the present invention has an increased crosslinking density by virtue of the pseudo-crosslinking due to the agglomeration of oxyethylene glycol units and containing polyoxyethylene polyol with a low degree of unsaturation at a quantity equal to or more than the specified quantity, and as a result the foam with an apparent density of 45 kg/m$^3$ to 80 kg/m$^3$ and a 25% compression hardness of the foam test piece with a skin of 200 to 400 N/314 cm$^2$ has a hysteresis loss rate of lower than 22% and a residual strain rate after wet-heat compression of lower than 10%, and the foam with an apparent density of 30 kg/m$^3$ to less than 45 kg/m$^3$ and a 25% compression hardness of the foam test piece with a skin of 80 to 200 N/314 cm$^2$ has a hysteresis loss rate of lower than 28% and a residual strain rate after wet-heat compression of lower than 10%, and thus satisfactory physical properties to achieve the objects are exhibited.

It can be appreciated that, in the case that a polyoxyethylene polyol with a low degree of unsaturation is not contained in the specified quantity, as Examples K-48 to K-51 and Reference Examples K-52 and K-53 in Table 17, the hysteresis loss rate or residual strain rate after wet-heat compression, or both of them may not reach the above-described satisfactory targeted values in a sufficient manner. In the case of Examples K-48 and K-49, however, a flexible foam having an apparent density of lower than 55 kg/m$^3$, a 25% compression hardness of the foam test piece with a skin of 100 to 400 N/314 cm$^2$, a modulus of repulsion elasticity of 45 to 65%, and a hysteresis loss rate of lower than 28% was obtained.

In the case of the TDI/MDI blend isocyanate commonly used, as Comparative Example K-60 in Table 18, the hysteresis loss and the residual strain rate after wet-heat compression are high, although the modulus of repulsion elasticity is high, and thus it is difficult to keep an original shape in use for a seat back for vehicles.

In the case of Comparative Example K-54, the setting of the NCO content is excessively low, and thus it is impossible to reduce the density of the foam to a density intended for seat backs.

In the case of Comparative Example K-55, the setting of the NCO content was high and the quantity of a polyol having an oxyethylene glycol unit was small, and accordingly the crosslinking effect due to the agglomeration was low, and as a result the hysteresis loss rate was over 22%.

In the case that the MDI content is lowered, as Comparative Example K-56, the chemical crosslinking density in the flexible foam resin is excessively high, and thus the mechanical properties tend to be deteriorated.

In the case that the oxyethylene content of a polyol as a modifier is 50% by mass or less, as Comparative Examples K-58 and 59, the chemical crosslinking density in the flexible foam resin is lowered, and the hysteresis loss rate and residual strain rate after wet-heat compression are high, and the durability is deteriorated.

Although the present invention has been described in detail with reference to specific embodiments, it is apparent to those skilled in the art that various variations and modifications may be added without departing from the essence and scope of the present invention.

All of the content of the specification, claims, drawings, and abstract of each of Japanese Patent Application No. 2014-452677 filed on Jul. 28, 2014, Japanese Patent Application No. 2014492444 filed on Sep. 22, 2014, and Japanese Patent Application No. 2014-192446 filed on Sep. 22, 2014, is incorporated by reference herein as the disclosure of the specification of the present invention.

The invention claimed is:

1. A polyisocyanate composition for producing a flexible polyurethane foam, comprising:
   a modified polyphenylene-polymethylene polyisocyanate (c) in which a polyphenylene-polymethylene polyisocyanate (a) is urethane-modified with a polyol (b),
   wherein the polyphenylene-polymethylene polyisocyanate (a) contains 78 to 90% by mass of diphenylmethane diisocyanate, a quantity of 2,2'-diphenylmethane diisocyanate and 2,4'-diphenylmethane diisocyanate contained in the diphenylmethane diisocyanate is 10 to 50% by mass based on a total quantity of the diphenylmethane diisocyanate, the polyol (b) contains 50 to 100% by mass of a polyoxyethylene unit and has an average number of functional groups of 1.7 to 4, and an isocyanate content of the modified polyphenylene-polymethylene polyisocyanate (c) is 25 to 32% by mass.

2. The polyisocyanate composition for producing a flexible polyurethane foam according to claim 1, wherein the freezing point of the polyol (b) at atmospheric pressure is within a range of 10 to 45° C.

3. A method for producing a polyisocyanate composition for producing a flexible polyurethane foam, comprising
   reacting a polyphenylene-polymethylene polyisocyanate (a) and a polyol (b) so that a modified polyphenylene-polymethylene polyisocyanate (c) in which the polyphenylene-polymethylene polyisocyanate (a) is urethane-modified with the polyol (b) is obtained and that an isocyanate content of the modified polyphenylene-polymethylene polyisocyanate (c) reaches 25 to 32% by mass,
   wherein the polyphenylene-polymethylene polyisocyanate (a) contains 78 to 90% by mass of diphenylmethane diisocyanate, a quantity of 2,2'-diphenylmethane diisocyanate and 2,4'-diphenylmethane diisocyanate contained in the diphenylmethane diisocyanate is 10 to 50% by mass based on a total quantity of the diphenylmethane diisocyanate, and the polyol (b) contains 50 to 100% by mass of a polyoxyethylene unit and has an average number of functional groups of 1.7 to 4.

4. The polyisocyanate composition for producing a flexible polyurethane foam according to claim 1, wherein the polyol (b) has an average number of functional groups of 1.9 to 2.4.

5. The polyisocyanate composition for producing a flexible polyurethane foam according to claim 1, wherein the freezing point of the polyol (b) at atmospheric pressure is within a range of 20 to 40° C.

6. The polyisocyanate composition for producing a flexible polyurethane foam according to claim 1, wherein the quantity of the 2,2'-diphenylmethane diisocyanate and the 2,4'-diphenylmethane diisocyanate contained in the diphenylmethane diisocyanate is 20 to 45% by mass based on a total quantity of the diphenylmethane diisocyanate.

7. The polyisocyanate composition for producing a flexible polyurethane foam according to claim 1, wherein the polyphenylene-polymethylene polyisocyanate (a) contains 78 to 85% by mass of the diphenylmethane diisocyanate.

8. The method for producing a polyisocyanate composition according to claim 3, wherein the freezing point of the polyol (b) at atmospheric pressure is within a range of 10 to 45° C.

9. The polyisocyanate composition for producing a flexible polyurethane foam according to claim 2, wherein the polyol (b) has an average number of functional groups of 1.9 to 2.4.

10. The polyisocyanate composition for producing a flexible polyurethane foam according to claim 2, wherein the quantity of the 2,2'-diphenylmethane diisocyanate and the 2,4'-diphenylmethane diisocyanate contained in the diphenylmethane diisocyanate is 20 to 45% by mass based on a total quantity of the diphenylmethane diisocyanate.

11. The polyisocyanate composition for producing a flexible polyurethane foam according to claim 2, wherein the polyphenylene-polymethylene polyisocyanate (a) contains 78 to 85% by mass of the diphenylmethane diisocyanate.

12. The polyisocyanate composition for producing a flexible polyurethane foam according to claim 4, wherein the freezing point of the polyol (b) at atmospheric pressure is within a range of 20 to 40° C.

13. The polyisocyanate composition for producing a flexible polyurethane foam according to claim 4, wherein the quantity of the 2,2'-diphenylmethane diisocyanate and the 2,4'-diphenylmethane diisocyanate contained in the diphenylmethane diisocyanate is 20 to 45% by mass based on a total quantity of the diphenylmethane diisocyanate.

14. The polyisocyanate composition for producing a flexible polyurethane foam according to claim 4, wherein the polyphenylene-polymethylene polyisocyanate (a) contains 78 to 85% by mass of the diphenylmethane diisocyanate.

15. The polyisocyanate composition for producing a flexible polyurethane foam according to claim 5, wherein the quantity of the 2,2'-diphenylmethane diisocyanate and the 2,4'-diphenylmethane diisocyanate contained in the diphenylmethane diisocyanate is 20 to 45% by mass based on a total quantity of the diphenylmethane diisocyanate.

16. The polyisocyanate composition for producing a flexible polyurethane foam according to claim 5, wherein the polyphenylene-polymethylene polyisocyanate (a) contains 78 to 85% by mass of the diphenylmethane diisocyanate.

17. The polyisocyanate composition for producing a flexible polyurethane foam according to claim 6, wherein the polyphenylene-polymethylene polyisocyanate (a) contains 78 to 85% by mass of the diphenylmethane diisocyanate.

18. The method for producing a polyisocyanate composition according to claim 3, wherein the polyol (b) has an average number of functional groups of 1.9 to 2.4.

19. The method for producing a polyisocyanate composition according to claim 3, wherein the quantity of the 2,2'-diphenylmethane diisocyanate and the 2,4'-diphenylmethane diisocyanate contained in the diphenylmethane diisocyanate is 20 to 45% by mass based on a total quantity of the diphenylmethane diisocyanate.

20. The method for producing a polyisocyanate composition according to claim 3, wherein the polyphenylene-polymethylene polyisocyanate (a) contains 78 to 85% by mass of the diphenylmethane diisocyanate.

* * * * *